(12) United States Patent
Jin

(10) Patent No.: US 10,080,170 B2
(45) Date of Patent: Sep. 18, 2018

(54) NETWORK HANDOVER METHOD, APPARATUS, DEVICE, AND SYSTEM

(71) Applicant: Huawei Technologies Co., Ltd., Shenzhen (CN)

(72) Inventor: Weisheng Jin, Shanghai (CN)

(73) Assignee: Huawei Technologies Co., Ltd, Shenzhen (CN)

( * ) Notice: Subject to any disclaimer, the term of this patent is extended or adjusted under 35 U.S.C. 154(b) by 219 days.

(21) Appl. No.: 15/009,975

(22) Filed: Jan. 29, 2016

(65) Prior Publication Data

US 2016/0165508 A1   Jun. 9, 2016

Related U.S. Application Data

(63) Continuation of application No. PCT/CN2013/080390, filed on Jul. 30, 2013.

(51) Int. Cl.
*H04L 1/00* (2006.01)
*H04W 36/16* (2009.01)
(Continued)

(52) U.S. Cl.
CPC ...... *H04W 36/165* (2013.01); *H04W 36/0011* (2013.01); *H04W 36/14* (2013.01);
(Continued)

(58) Field of Classification Search
CPC ..... H04B 7/2615; H04B 7/18541; H04J 4/00; H04L 5/26; H04L 47/767; H04L 1/0002;
(Continued)

(56) References Cited

U.S. PATENT DOCUMENTS

2004/0165563 A1   8/2004   Hsu et al.
2008/0225829 A1   9/2008   Sachs et al.
(Continued)

FOREIGN PATENT DOCUMENTS

CN   1823497 A   8/2006
CN   101248690 A   8/2008
(Continued)

OTHER PUBLICATIONS

"3rd Generation Partnership Project: Technical Specification Group Services and System Aspects; Architecture Enhancements for Non-3GPP Accesses (Release 12)," 3GPP TS 23.402 V12.1.0, Jun. 2013, pp. 1-254.
(Continued)

*Primary Examiner* — Dady Chery
(74) *Attorney, Agent, or Firm* — Slater Matsil, LLP

(57) ABSTRACT

Embodiments provide a network handover method, apparatus, device, and system and relate to the communications field. The method is used in a control node and include: acquiring first state information of a WLAN AP that UE accesses and second state information of a cellular network corresponding to a location of the UE. If it is determined that the first state information and the second state information meet a preset first handover condition, the method includes generating first handover information, and sending the first handover information to a handover node, so that the handover node sends, to the UE, a first handover command that is generated according to the first handover information, and the UE attaches to the cellular network indicated by the first handover command, receives an IP address of the UE in the cellular network, and implements a handover from a WLAN to the cellular network.

14 Claims, 14 Drawing Sheets

(51) Int. Cl.
*H04W 36/14* (2009.01)
*H04W 36/38* (2009.01)
*H04W 36/00* (2009.01)
*H04W 84/12* (2009.01)

(52) U.S. Cl.
CPC ........ *H04W 36/38* (2013.01); *H04W 36/0033* (2013.01); *H04W 84/12* (2013.01)

(58) Field of Classification Search
CPC .... H04L 1/20; H04W 36/00; H04W 36/0005; H04W 36/0016; H04W 36/0083; H04W 36/0088; H04W 36/0094; H04W 28/0257; H04W 28/04

USPC ............................ 370/330–337; 455/436–444

See application file for complete search history.

(56) References Cited

U.S. PATENT DOCUMENTS

| | | |
|---|---|---|
| 2010/0111040 A1 | 5/2010 | Perras |
| 2012/0163341 A1 | 6/2012 | Shaheen |
| 2017/0181114 A1* | 6/2017 | Lu .................. H04W 60/00 |
| 2017/0289862 A1* | 10/2017 | Shaheen .......... H04W 36/0022 |

FOREIGN PATENT DOCUMENTS

| | | |
|---|---|---|
| CN | 102204339 A | 9/2011 |
| CN | 102984786 A | 3/2013 |
| EP | 1694036 A1 | 8/2006 |
| EP | 2688363 A2 | 1/2014 |
| WO | 2011157152 A2 | 12/2011 |
| WO | 2013059313 A1 | 4/2013 |

OTHER PUBLICATIONS

"Part 11: Wireless LAN Medium Access Control (MAC) and Physical Layer (PHY) Specifications," IEEE Standard for Information Technology—Telecommunications and Information Exchange Between Systems Local and Metropolitan Area Networks—Specific Requirements, IEEE Std 802.11, Mar. 29, 2012, pp. 1-2793.

* cited by examiner

NETWORK HANDOVER METHOD, APPARATUS, DEVICE, AND SYSTEM

This application is a continuation of International Patent Application No. PCT/CN2013/080390, filed on Jul. 30, 2013, which is hereby incorporated by reference in its entirety.

TECHNICAL FIELD

The present invention relates to the communications field, and in particular, to a network handover method, apparatus, device, and system.

BACKGROUND

In recent years, rapid popularization of intelligent terminals and mobile applications has accelerated the development of mobile Internet, which brings an impact of a large amount of data to a mobile network. A situation in which a 2G (2nd Generation, 2nd generation mobile communications technology)/3G (3rd Generation, 3rd generation mobile communications technology) mobile network of an operator is overloaded occurs worldwide frequently. An overwhelming majority of current and future intelligent terminals support or will support a WLAN (Wireless Local Area Network). Therefore, before widespread deployment of LTE (Long Term Evolution), the WLAN, which is originally intended mainly for enterprise and family scenarios, has attracted great attention in the industry as a way of offloading data traffic from a mobile network for an operator. A top priority problem that many operators want to resolve is how to improve a network that uses the WLAN technology into a network form that is operable to a cellular operator or can interwork with a cellular network.

A cellular network may include LTE, a UMTS (Universal Mobile Telecommunications System), and a GSM (Global System for Mobile Communications). Interworking between a UMTS and a WLAN is used as an example for description.

In a process in which UE (User Equipment) is handed over from a WLAN to a UMTS, the UE decides by itself to perform a GPRS (General Packet Radio Service) attach; after completing the GPRS attach, the UE sends, to an SGSN (Serving GPRS Support Node), NAS (Non Access Stratum) information for establishing a PDN (Packet Data Network) connection, where a value of a request type in the NAS information is handover; after determining the request type, the SGSN selects a packet data network gateway (P-GW) for the UE and implements, according to an IP (Internet Protocol) address sent by the PGW, a handover from the WLAN to the UMTS.

In a process in which UE is handed over from a UMTS to a WLAN, for example, to an untrusted WLAN network, the UE decides by itself to perform WLAN access authentication; after the access authentication is completed, an ePDG (Evolved Packet Data Gateway) selects a PGW for the UE according to a handover request in a PDN connection establishment message sent by the UE and a PGW identity acquired when the authentication is performed on the UE, and implements, according to an IP address sent by the PGW, a handover from the UMTS to the WLAN.

When UE performs a handover between a cellular network and a WLAN, the UE needs to decide by itself to initiate a handover, for example, the UE decides by itself to perform a GPRS attach or decides by itself to perform WLAN access authentication. Because states of the cellular network and the WLAN cannot be acquired before the UE decides by itself to initiate a handover, the UE cannot determine a handover occasion according to the states, which not only reduces accuracy of a network handover, but also increases complexity of the network handover.

SUMMARY

States of a cellular network and a WLAN cannot be acquired before UE decides by itself to initiate a network handover, and therefore the UE cannot determine a handover occasion according to the states, which not only reduces accuracy of a network handover, but also increases complexity of the network handover. To resolve the foregoing problem, embodiments provide a network handover method, apparatus, device, and system. The technical solutions are as follows. According to a first aspect, an embodiment provides a network handover method, where the method is used in a control node. The method includes acquiring first state information of a wireless local area network access point WLAN AP that user equipment UE accesses and second state information of a cellular network corresponding to a location of the UE. If it is determined that the first state information and the second state information meet a preset first handover condition, the method includes generating first handover information. The method also includes sending the first handover information to a handover node, so that the handover node sends, to the UE, a first handover command that is generated according to the first handover information; and the UE attaches to the cellular network indicated by the first handover command, receives an Internet Protocol (IP) address of the UE in the cellular network, and implements a handover from the WLAN to the cellular network.

In a first possible implementation manner of the first aspect, the acquiring first state information of a wireless local area network access point WLAN AP that user equipment UE accesses and second state information of a cellular network corresponding to a location of the UE includes acquiring the location of the UE; determining, according to the location, an access controller AC/a broadband network gateway BNG of the WLAN that the UE accesses, and acquiring the first state information of the WLAN AP from the AC/BNG; and searching for the second state information of the cellular network corresponding to the location of the UE, where the cellular network corresponding to the location of the UE is: a cellular network to which the UE connects, or a cellular network that the UE camps on, or a cellular network corresponding to a coverage area to which the location belongs, or a cellular network corresponding to a coverage area adjacent to a coverage area to which the location belongs.

With reference to the first aspect or the first possible implementation manner of the first aspect, in a second possible implementation manner of the first aspect, after it is determined that the first state information and the second state information meet the preset first handover condition, the method further includes: acquiring a UE identity and a packet data network PDN identity, and establishing a cellular network handover preparation context according to the UE identity and the PDN identity. After the establishing a cellular network handover preparation context according to the UE identity and the PDN identity, the method further includes: reading a UE identity of the UE that currently attaches to the cellular network; searching for a cellular network handover preparation context corresponding to the UE identity; if the cellular network handover preparation context corresponding to the UE identity is found, setting a first handover instruction; and sending the first handover instruction and the PDN identity to a mobility management device, so that the mobility management device instructs a packet data network gateway PGW to allocate the IP address of the UE in the cellular network to the UE, and the UE implements a handover from the WLAN to the cellular network, where the IP address of the UE in the cellular network is the same as an IP address of the UE in the WLAN.

With reference to the second possible implementation manner of the first aspect, in a third possible implementation manner of the first aspect, the reading a UE identity of the UE that currently attaches to the cellular network includes: acquiring the UE identity in an attach request sent by the UE; or sending an identity request to the UE, and receiving a UE identity that is fed back according to the identity request by the UE; or acquiring the UE identity carried in a preset parameter, where the preset parameter is an access point name APN or a protocol configuration option PCO; or acquiring the UE identity in radio resource control RRC information sent by the UE.

With reference to the second possible implementation manner of the first aspect, in a fourth possible implementation manner of the first aspect, the sending the first handover instruction and the PDN identity to a mobility management device, so that the mobility management device instructs a PGW to allocate the IP address of the UE in the cellular network to the UE includes: if the cellular network is a Universal Mobile Telecommunications System UMTS or a Global System for Mobile Communications GSM, sending, by the control node, the first handover instruction and the PDN identity that is carried in the cellular network handover preparation context to a serving GPRS support node SGSN, or instructing, by the control node, a first node to send the first handover instruction and the PDN identity that is carried in the cellular network handover preparation context to the SGSN, so that the SGSN determines the PGW according to the first handover instruction, the PDN identity, and subscription information of the UE and sends a second handover instruction and the PDN identity to the PGW, and the PGW returns, to the SGSN according to the second handover instruction and the PDN identity, the IP address that is of the UE in the cellular network and allocated to the UE; or if the cellular network is Long Term Evolution LTE, sending, by the control node, the first handover instruction and the PDN identity that is carried in the cellular network handover preparation context to a mobility management entity MME, or instructing, by the control node, a second node to send the first handover instruction and the PDN identity that is carried in the cellular network handover preparation context to the MME, so that the MME determines the PGW according to the first handover instruction, the PDN identity, and subscription information of the UE and sends a second handover instruction and the PDN identity to the PGW, and the PGW returns, to the MME according to the second handover instruction and the PDN identity, the IP address that is of the UE in the cellular network and allocated to the UE; where the IP address of the UE in the cellular network is the same as the IP address of the UE in the WLAN.

According to a second aspect, an embodiment provides a network handover method, where the method is used in user equipment UE. The method includes receiving a first handover command that is generated according to first handover information by a handover node, where the first handover command is generated according to the first handover information, and the first handover information is generated when a control node acquires first state information of a wireless local area network access point WLAN AP that the UE accesses and second state information of a cellular network corresponding to a location of the UE and it is determined that the first state information and the second state information meet a preset first handover condition. The method also includes attaching to the cellular network indicated by the first handover command; and receiving an Internet Protocol (IP) address of the UE in the cellular network, and implementing a handover from the WLAN to the cellular network.

In a first possible implementation manner of the second aspect, the receiving a first handover command that is generated according to first handover information by a handover node includes: receiving, by using user plane signaling, the first handover command generated by the handover node; or receiving, by using the Internet Protocol Security IPsec protocol, the Internet Key Exchange IKE protocol, the Extensible Authentication Protocol EAP, or dedicated control signaling, the first handover command generated by the handover node.

With reference to the second aspect or the first possible implementation manner of the second aspect, in a second possible implementation manner of the second aspect, if the cellular network is a Universal Mobile Telecommunications System (UMTS) or a Global System for Mobile Communications (GSM) and the first handover command includes a packet data network PDN identity, before the receiving an Internet Protocol (IP) address of the UE in the cellular network, the method further includes: sending, to the control node, the PDN identity or both the PDN identity and a preset parameter that carries a UE identity, so that after finding a cellular network handover preparation context corresponding to the acquired UE identity, the control node sets a first handover instruction and sends the first handover instruction to a mobility management device, and the mobility management device instructs a PGW to allocate the IP address of the UE in the cellular network to the UE, where the preset parameter is an access point name APN or a protocol configuration option PCO, and the IP address of the UE in the cellular network is the same as an IP address of the UE in the WLAN.

With reference to the second aspect or the first possible implementation manner of the second aspect, in a third possible implementation manner of the second aspect, the method further includes: adding a UE identity into radio resource control RRC information and sending the RRC information to the control node; or receiving an identity request sent by the control node, and feeding back the UE identity to the control node according to the identity request.

According to a third aspect, an embodiment provides a network handover method, where the method is used in a handover node, and the method includes: receiving first handover information sent by a control node, where the first handover information is generated when the control node acquires first state information of a wireless local area network access point WLAN AP that user equipment UE accesses and second state information of a cellular network corresponding to a location of the UE and it is determined that the first state information and the second state information meet a preset first handover condition. The method also includes generating a first handover command according to the first handover information; and sending the first handover command to the UE, so that the UE receives the first handover command that is generated according to the first handover information by the handover node, attaches to the cellular network indicated by the first handover command, receives an Internet Protocol IP address of the UE in the cellular network, and implements a handover from the WLAN to the cellular network.

In a first possible implementation manner of the third aspect, the sending the first handover command to the user equipment UE includes: sending the first handover command to the UE by using user plane signaling; or sending the first handover command to the UE by using the Internet Protocol Security (IPsec) protocol, the Internet Key Exchange (IKE) protocol, the Extensible Authentication Protocol (EAP), or dedicated control signaling.

With reference to the third aspect or the first possible implementation manner of the third aspect, in a second possible implementation manner of the third aspect, before the receiving first handover information sent by a control node, the method further includes: acquiring the location of the UE by using the user plane signaling, or acquiring the location of the UE by using the IPsec, the IKE, the EAP, or the dedicated control signaling. The method also includes sending the location to the control node, so that after acquiring the location, the control node acquires the first state information of the WLAN AP that the UE accesses and the second state information of the cellular network corresponding to the location.

With reference to the third aspect or the first possible implementation manner of the third aspect, in a third possible implementation manner of the third aspect, before the receiving first handover information sent by a control node, the method further includes: acquiring, by using the user plane signaling, a UE identity and acquiring a packet data network PDN identity, or acquiring, by using the IPsec, the IKE, the EAP, or the dedicated control signaling, a UE identity and acquiring a PDN identity. The method also includes sending the UE identity and the PDN identity to the control node, so that the control node establishes a cellular network handover preparation context according to the UE identity and the PDN identity.

According to a fourth aspect, an embodiment provides a network handover method, where the method is used in a control node, and the method includes: acquiring first state information of a wireless local area network access point WLAN AP corresponding to a location of user equipment UE and second state information of a cellular network that the UE accesses. If it is determined that the first state information and the second state information meet a preset second handover condition, the method includes generating second handover information; and instructing a preset node to send, to the UE, a second handover command that is generated according to the second handover information, so that the UE accesses the WLAN AP indicated by the second handover command, receives an Internet Protocol IP address of the UE in the WLAN, and implements a handover from the cellular network to the WLAN.

In a first possible implementation manner of the fourth aspect, the acquiring first state information of a wireless local area network access point WLAN AP corresponding to a location of user equipment UE and second state information of a cellular network that the UE accesses includes: acquiring the location of the UE; searching for an access controller AC/a broadband network gateway BNG of a WLAN AP that is corresponding to a coverage area to which the location belongs or corresponding to a coverage area adjacent to a coverage area to which the location belongs, and acquiring the first state information of the WLAN AP from the AC/BNG; and acquiring the second state information of the cellular network that the UE accesses.

With reference to the fourth aspect or the first possible implementation manner of the fourth aspect, in a second possible implementation manner of the fourth aspect, the generating second handover information includes: acquiring a UE identity, an identifier of the WLAN AP, and a packet data network PDN identity; and adding the UE identity, the identifier of the WLAN AP, and the PDN identity into the second handover information, where the UE identity and the PDN identity are used to generate notification information, and the identifier of the WLAN AP is used to generate the second handover command.

With reference to the second possible implementation manner of the fourth aspect, in a third possible implementation manner of the fourth aspect, after the generating second handover information, the method further includes: adding, into the notification information, the UE identity and the PDN identity that are carried in the second handover information; and sending the notification information to a trusted gateway TGW; or sending the notification information to a mobility control function-wireless local area network MCF-W and forwarding, by the MCF-W, the notification information to the TGW, so that the TGW establishes a WLAN handover preparation context according to the UE identity and the PDN identity, and after finding a WLAN handover preparation context corresponding to a UE identity of UE that performs WLAN AP access authentication, determines a packet data network gateway PGW according to the WLAN handover preparation context and subscription information of the UE and sends a handover instruction to the PGW, and the PGW returns, to the TGW according to the handover instruction, the IP address that is of the UE in the WLAN and allocated to the UE, where the IP address of the UE in the WLAN is the same as an IP address of the UE in the cellular network.

According to a fifth aspect, an embodiment provides a network handover method, where the method is used in user equipment UE. The method includes: receiving a second handover command that is generated according to second handover information, where the second handover information is generated when a control node acquires first state information of a wireless local area network access point WLAN AP corresponding to a location of the UE and second state information of a cellular network that the UE accesses and it is determined that the first state information and the second state information meet a preset second handover condition; and accessing the WLAN AP indicated by the second handover command. The method also includes receiving an Internet Protocol (IP) address of the UE in the WLAN, and implementing a handover from the cellular network to the WLAN.

In a first possible implementation manner of the fifth aspect, before the receiving a second handover command that is generated according to second handover information, the method further includes: reporting the location of the UE to the control node, so that after acquiring the location, the control node acquires the first state information of the WLAN AP corresponding to the location and the second state information of the cellular network that the UE accesses.

With reference to the fifth aspect or the first possible implementation manner of the fifth aspect, in a second possible implementation manner of the fifth aspect, before the receiving a second handover command that is generated according to second handover information, the method further includes: reporting a UE identity to the control node, where the UE identity is added into notification information and sent to a trusted gateway TGW by the control node, so that the TGW establishes a WLAN handover preparation context according to the UE identity and a packet data network PDN identity that is added by the control node into the notification information, and after finding a WLAN handover preparation context corresponding to a UE identity of UE that performs WLAN AP access authentication, determines a packet data network gateway PGW according to the WLAN handover preparation context and subscription information of the UE and sends a handover instruction to the PGW, and the PGW returns, to the TGW according to the handover instruction, the IP address that is of the UE in the WLAN and allocated to the UE, where the IP address of the UE in the WLAN is the same as an IP address of the UE in the cellular network.

According to a sixth aspect, an embodiment provides a control apparatus, where the apparatus is used in a control node. The apparatus includes: a first acquiring module, configured to acquire first state information of a wireless local area network access point WLAN AP that user equipment UE accesses and second state information of a cellular network corresponding to a location of the UE. The apparatus also includes a first generating module, configured to: if it is determined that the first state information and the second state information that are acquired by the first acquiring module meet a preset first handover condition, generate first handover information; and a first sending module, configured to send the first handover information to a handover node, so that the handover node sends, to the UE, a first handover command that is generated according to the first handover information generated by the first generating module, and the UE attaches to the cellular network indicated by the first handover command, receives an Internet Protocol IP address of the UE in the cellular network, and implements a handover from the WLAN to the cellular network.

In a first possible implementation manner of the sixth aspect, the first acquiring module includes: a first acquiring unit, configured to acquire the location of the UE. The module also includes a second acquiring unit, configured to determine, according to the location acquired by the first acquiring unit, an access controller AC/a broadband network gateway BNG of the WLAN that the UE accesses, and acquire the first state information of the WLAN AP from the AC/BNG. The module also includes a searching unit, configured to search for the second state information of the cellular network corresponding to the location of the UE that is acquired by the first acquiring unit. The cellular network corresponding to the location of the UE is: a cellular network to which the UE connects, or a cellular network that the UE camps on, or a cellular network corresponding to a coverage area to which the location belongs, or a cellular network corresponding to a coverage area adjacent to a coverage area to which the location belongs.

With reference to the sixth aspect or the first possible implementation manner of the sixth aspect, in a second possible implementation manner of the sixth aspect, the apparatus further includes: an establishing module, configured to: after the first generating module determines that the first state information and the second state information meet the preset first handover condition, acquire a UE identity and a packet data network PDN identity and establish a cellular network handover preparation context according to the UE identity and the PDN identity. The apparatus further includes: a reading module, configured to: after the establishing module establishes the cellular network handover preparation context according to the UE identity and the PDN identity, read a UE identity of the UE that currently attaches to the cellular network. The apparatus also includes a searching module, configured to search for a cellular network handover preparation context corresponding to the UE identity read by the reading module. The apparatus also includes a setting module, configured to: if the searching module finds the cellular network handover preparation context corresponding to the UE identity, set a first handover instruction; and a second sending module, configured to send the first handover instruction set by the setting module and the PDN identity to a mobility management device, so that the mobility management device instructs a packet data network gateway PGW to allocate the IP address of the UE in the cellular network to the UE, and the UE implements a handover from the WLAN to the cellular network, where the IP address of the UE in the cellular network is the same as an IP address of the UE in the WLAN.

With reference to the second possible implementation manner of the sixth aspect, in a third possible implementation manner of the sixth aspect, the reading module is configured to: acquire the UE identity in an attach request sent by the UE; or send an identity request to the UE and receive a UE identity that is fed back according to the identity request by the UE; or acquire the UE identity carried in a preset parameter, where the preset parameter is an access point name APN or a protocol configuration option PCO; or acquire the UE identity in radio resource control RRC information sent by the UE.

With reference to the second possible implementation manner of the sixth aspect, in a fourth possible implementation manner of the sixth aspect, the second sending module includes: a first sending unit, configured to: if the cellular network is a Universal Mobile Telecommunications System (UMTS) or a Global System for Mobile Communications (GSM), send, by the control node, the first handover instruction and the PDN identity that is carried in the cellular network handover preparation context to a serving GPRS support node SGSN, or instruct, by the control node, a first node to send the first handover instruction and the PDN identity that is carried in the cellular network handover preparation context to the SGSN, so that the SGSN determines the PGW according to the first handover instruction, the PDN identity, and subscription information of the UE and sends a second handover instruction and the PDN identity to the PGW, and the PGW returns, to the SGSN according to the second handover instruction and the PDN identity, the IP address that is of the UE in the cellular network and allocated to the UE; or a second sending unit, configured to: if the cellular network is Long Term Evolution LTE, send, by the control node, the first handover instruction and the PDN identity that is carried in the cellular network handover preparation context to a mobility management entity MME, or instruct, by the control node, a second node to send the first handover instruction and the PDN identity that is carried in the cellular network handover preparation context to the MME, so that the MME determines the PGW according to the first handover instruction, the PDN identity, and subscription information of the UE and sends a second handover instruction and the PDN identity to the PGW, and the PGW returns, to the MME according to the second handover instruction and the PDN identity, the IP address that is of the UE in the cellular network and allocated to the UE. The IP address of the UE in the cellular network is the same as the IP address of the UE in the WLAN.

According to a seventh aspect, an embodiment provides a user apparatus, where the apparatus is used in user equipment (UE). The apparatus includes: a first receiving module, configured to receive a first handover command that is generated according to first handover information by a handover node, where the first handover information is generated when a control node acquires first state information of a wireless local area network access point WLAN AP that the UE accesses and second state information of a cellular network corresponding to a location of the UE and it is determined that the first state information and the second state information meet a preset first handover condition. Also included is an attaching module, configured to attach to the cellular network indicated by the first handover command received by the first receiving module; and a second receiving module, configured to: after the attaching module attaches to the cellular network indicated by the first handover command, receive an Internet Protocol IP address of the UE in the cellular network and implement a handover from the WLAN to the cellular network.

In a first possible implementation manner of the seventh aspect, the first receiving module is configured to: receive, by using user plane signaling, the first handover command generated by the handover node; or receive, by using the Internet Protocol Security (IPsec) protocol, the Internet Key Exchange (IKE) protocol, the Extensible Authentication Protocol (EAP), or dedicated control signaling, the first handover command generated by the handover node.

With reference to the seventh aspect or the first possible implementation manner of the seventh aspect, in a second possible implementation manner of the seventh aspect, if the cellular network is a Universal Mobile Telecommunications System (UMTS) or a Global System for Mobile Communications (GSM) and the first handover command includes a packet data network PDN identity, the apparatus further includes: a third sending module, configured to: before the second receiving module receives the Internet Protocol (IP) address of the UE in the cellular network, send, to the control node, the PDN identity or both the PDN identity and a preset parameter that carries a UE identity, so that after finding a cellular network handover preparation context corresponding to the acquired UE identity, the control node sets a first handover instruction and sends the first handover instruction to a mobility management device, and the mobility management device instructs a PGW to allocate the IP address of the UE in the cellular network to the UE, where the preset parameter is an access point name APN or a protocol configuration option PCO, and the IP address of the UE in the cellular network is the same as an IP address of the UE in the WLAN.

With reference to the seventh aspect or the first possible implementation manner of the seventh aspect, in a third possible implementation manner of the seventh aspect, the apparatus further includes: a fourth sending module, configured to: add a UE identity into radio resource control RRC information and send the RRC information to the control node; or receive an identity request sent by the control node and feed back the UE identity to the control node according to the identity request.

According to an eighth aspect, an embodiment provides a handover apparatus, where the apparatus is used in a handover node. The apparatus includes: a third receiving module, configured to receive first handover information sent by a control node, where the first handover information is generated when the control node acquires first state information of a wireless local area network access point WLAN AP that user equipment UE accesses and second state information of a cellular network corresponding to a location of the UE and it is determined that the first state information and the second state information meet a preset first handover condition. Also included is a second generating module, configured to generate a first handover command according to the first handover information received by the third receiving module; and a fifth sending module, configured to send the first handover command generated by the second generating module to the UE, so that the UE receives the first handover command that is generated according to the first handover information by the handover node, attaches to the cellular network indicated by the first handover command, receives an Internet Protocol IP address of the UE in the cellular network, and implements a handover from the WLAN to the cellular network.

In a first possible implementation manner of the eighth aspect, the fifth sending module is configured to: send the first handover command to the UE by using user plane signaling; or send the first handover command to the UE by using the Internet Protocol Security (IPsec) protocol, the Internet Key Exchange (IKE) protocol, the Extensible Authentication Protocol (EAP), or dedicated control signaling.

With reference to the eighth aspect or the first possible implementation manner of the eighth aspect, in a second possible implementation manner of the eighth aspect, the apparatus further includes: a second acquiring module, configured to: before the third receiving module receives the first handover information sent by the control node, acquire the location of the UE by using the user plane signaling; or acquire the location of the UE by using the IPsec, the IKE, the EAP, or the dedicated control signaling. The apparatus also includes a sixth sending module, configured to send the location acquired by the second acquiring module to the control node, so that after acquiring the location, the control node acquires the first state information of the WLAN AP that the UE accesses and the second state information of the cellular network corresponding to the location.

With reference to the eighth aspect or the first possible implementation manner of the eighth aspect, in a third possible implementation manner of the eighth aspect, the apparatus further includes: a third acquiring module, configured to: before the third receiving module receives the first handover information sent by the control node, acquire, by using the user plane signaling, a UE identity and acquire a packet data network PDN identity; or acquire, by using the IPsec, the IKE, the EAP, or the dedicated control signaling, a UE identity and acquire a PDN identity. The apparatus also includes a seventh sending module, configured to send the UE identity and the PDN identity that are acquired by the third acquiring module to the control node, so that the control node establishes a cellular network handover preparation context according to the UE identity and the PDN identity.

According to a ninth aspect, an embodiment provides a control apparatus, where the apparatus is used in a control node, and the apparatus includes an acquiring module, configured to acquire first state information of a wireless local area network access point WLAN AP corresponding to a location of user equipment UE and second state information of a cellular network that the UE accesses. The apparatus also includes a generating module, configured to: if it is determined that the first state information and the second state information that are acquired by the acquiring module meet a preset second handover condition, generate second handover information; and an instructing module, configured to instruct a preset node to send, to the UE, a second handover command that is generated according to the second handover information generated by the generating module, so that the UE accesses the WLAN AP indicated by the second handover command, receives an Internet Protocol IP address of the UE in the WLAN, and implements a handover from the cellular network to the WLAN.

In a first possible implementation manner of the ninth aspect, the acquiring module includes: a first acquiring unit, configured to acquire the location of the UE; a searching unit, configured to: search for an access controller AC/a broadband network gateway BNG of a WLAN AP that is acquired by the first acquiring unit and is corresponding to a coverage area to which the location belongs or corresponding to a coverage area adjacent to a coverage area to which the location belongs, and acquire the first state information of the WLAN AP from the AC/BNG; and a second acquiring unit, configured to acquire the second state information of the cellular network that the UE accesses.

With reference to the ninth aspect or the first possible implementation manner of the ninth aspect, in a second possible implementation manner of the ninth aspect, the generating module includes: a third acquiring unit, configured to acquire a UE identity, an identifier of the WLAN AP, and a packet data network PDN identity; and an adding unit, configured to add the UE identity, the identifier of the WLAN AP, and the PDN identity that are acquired by the third acquiring unit into the second handover information, where the UE identity and the PDN identity are used to generate notification information, and the identifier of the WLAN AP is used to generate the second handover command.

With reference to the second possible implementation manner of the ninth aspect, in a third possible implementation manner of the ninth aspect, the apparatus further includes: an adding module, configured to: after the generating module generates the second handover information, add, into the notification information, the UE identity and the PDN identity that are carried in the second handover information; and a sending module, configured to: send the notification information generated by the adding module to a trusted gateway TGW; or send the notification information generated by the adding module to a mobility control function-wireless local area network MCF-W and forwarding, by the MCF-W, the notification information to the TGW, so that the TGW establishes a WLAN handover preparation context according to the UE identity and the PDN identity, and after finding a WLAN handover preparation context corresponding to a UE identity of UE that performs WLAN AP access authentication, determines a packet data network gateway PGW according to the WLAN handover preparation context and subscription information of the UE and sends a handover instruction to the PGW, and the PGW returns, to the TGW according to the handover instruction, the IP address that is of the UE in the WLAN and allocated to the UE, where the IP address of the UE in the WLAN is the same as an IP address of the UE in the cellular network.

According to a tenth aspect, an embodiment provides a user apparatus, where the apparatus is used in user equipment UE. The apparatus includes: a first receiving module, configured to receive a second handover command that is generated according to second handover information, where the second handover information is generated when a control node acquires first state information of a wireless local area network access point WLAN AP corresponding to a location of the UE and second state information of a cellular network that the UE accesses and it is determined that the first state information and the second state information meet a preset second handover condition. Also included is an access module, configured to access the WLAN AP indicated by the second handover command received by the first receiving module; and a second receiving module, configured to: after the access module accesses the WLAN AP indicated by the second handover command, receive an Internet Protocol IP address of the UE in the WLAN, and implement a handover from the cellular network to the WLAN.

In a first possible implementation manner of the tenth aspect, the apparatus further includes: a first reporting module, configured to: before the first receiving module receives the second handover command that is generated according to the second handover information, report the location of the UE to the control node, so that after acquiring the location, the control node acquires the first state information of the WLAN AP corresponding to the location and the second state information of the cellular network that the UE accesses.

With reference to the tenth aspect or the first possible implementation manner of the tenth aspect, in a second possible implementation manner of the tenth aspect, the apparatus further includes: a second reporting module, configured to: before the first receiving module receives the second handover command that is generated according to the second handover information, report a UE identity to the control node, where the UE identity is added into notification information and sent to a trusted gateway TGW by the control node, so that the TGW establishes a WLAN handover preparation context according to the UE identity and a packet data network PDN identity that is added by the control node into the notification information, and after finding a WLAN handover preparation context corresponding to a UE identity of UE that performs WLAN AP access authentication, determines a packet data network gateway PGW according to the WLAN handover preparation context and subscription information of the UE and sends a handover instruction to the PGW, and the PGW returns, to the TGW according to the handover instruction, the IP address that is of the UE in the WLAN and allocated to the UE, where the IP address of the UE in the WLAN is the same as an IP address of the UE in the cellular network.

According to an eleventh aspect, an embodiment provides a control apparatus, where the apparatus is used in a control node. The apparatus includes: a first receiver, configured to acquire first state information of a wireless local area network access point WLAN AP that user equipment UE accesses and second state information of a cellular network corresponding to a location of the UE; a first processor, configured to: if it is determined that the first state information and the second state information that are acquired by the first receiver meet a preset first handover condition, generate first handover information; and a first transmitter, configured to send the first handover information to a handover node, so that the handover node sends, to the UE, a first handover command that is generated according to the first handover information generated by the first processor, and the UE attaches to the cellular network indicated by the first handover command, receives an Internet Protocol IP address of the UE in the cellular network, and implements a handover from the WLAN to the cellular network.

In a first possible implementation manner of the eleventh aspect, the first receiver is specifically configured to: acquire the location of the UE; determine, according to the location, an access controller AC/a broadband network gateway BNG of the WLAN that the UE accesses, and acquire the first state information of the WLAN AP from the AC/BNG; and search for the second state information of the cellular network corresponding to the location of the UE. The cellular network corresponding to the location of the UE is: a cellular network to which the UE connects, or a cellular network that the UE camps on, or a cellular network corresponding to a coverage area to which the location belongs, or a cellular network corresponding to a coverage area adjacent to a coverage area to which the location belongs.

With reference to the eleventh aspect or the first possible implementation manner of the eleventh aspect, in a second possible implementation manner of the eleventh aspect, the first receiver is further configured to: after the first processor determines that the first state information and the second state information meet the preset first handover condition, acquire a UE identity and a packet data network PDN identity. The first processor is further configured to establish a cellular network handover preparation context according to the UE identity and the PDN identity that are acquired by the first receiver. The first receiver is further configured to: after the first processor establishes the cellular network handover preparation context according to the UE identity and PDN identity, read a UE identity of the UE that currently attaches to the cellular network. The first processor is further configured to: search for a cellular network handover preparation context corresponding to the UE identity received by the first receiver, and if the cellular network handover preparation context corresponding to the UE identity is found, set a first handover instruction. The first transmitter is further configured to send the first handover instruction set by the first processor and the PDN identity acquired by the first receiver to a mobility management device, so that the mobility management device instructs a packet data network gateway PGW to allocate the IP address of the UE in the cellular network to the UE, and the UE implements a handover from the WLAN to the cellular network, where the IP address of the UE in the cellular network is the same as an IP address of the UE in the WLAN.

With reference to the second possible implementation manner of the eleventh aspect, in a third possible implementation manner of the eleventh aspect, the first receiver is specifically configured to acquire the UE identity in an attach request sent by the UE; or the first transmitter is configured to send an identity request to the UE, and the first receiver is configured to receive a UE identity that is fed back by the UE according to the identity request sent by the first transmitter; or the first receiver is configured to acquire the UE identity carried in a preset parameter, where the preset parameter is an access point name APN or a protocol configuration option PCO; or the first receiver is configured to acquire the UE identity in radio resource control RRC information sent by the UE.

With reference to the second possible implementation manner of the eleventh aspect, in a fourth possible implementation manner of the eleventh aspect, the first transmitter is configured to: if the cellular network is a Universal Mobile Telecommunications System (UMTS) or a Global System for Mobile Communications (GSM), send, by the control node, the first handover instruction and the PDN identity that is carried in the cellular network handover preparation context to a serving GPRS support node SGSN, or instruct, by the control node, a first node to send the first handover instruction and the PDN identity that is carried in the cellular network handover preparation context to the SGSN, so that the SGSN determines the PGW according to the first handover instruction, the PDN identity, and subscription information of the UE and sends a second handover instruction and the PDN identity to the PGW, and the PGW returns, to the SGSN according to the second handover instruction and the PDN identity, the IP address that is of the UE in the cellular network and allocated to the UE; or if the cellular network is Long Term Evolution (LTE), send, by the control node, the first handover instruction and the PDN identity that is carried in the cellular network handover preparation context to a mobility management entity MME, or instruct, by the control node, a second node to send the first handover instruction and the PDN identity that is carried in the cellular network handover preparation context to the MME, so that the MME determines the PGW according to the first handover instruction, the PDN identity, and subscription information of the UE and sends a second handover instruction and the PDN identity to the PGW, and the PGW returns, to the MME according to the second handover instruction and the PDN identity, the IP address that is of the UE in the cellular network and allocated to the UE. The IP address of the UE in the cellular network is the same as the IP address of the UE in the WLAN.

According to a twelfth aspect, an embodiment provides a user apparatus, where the apparatus is used in user equipment UE. The apparatus includes a second receiver, configured to receive a first handover command that is generated according to first handover information by a handover node, where the first handover information is generated when a control node acquires first state information of a wireless local area network access point WLAN AP that the UE accesses and second state information of a cellular network corresponding to a location of the UE and it is determined that the first state information and the second state information meet a preset first handover condition. Also included is a second processor, configured to attach to the cellular network indicated by the first handover command received by the second receiver, where the second receiver is further configured to: after the second processor attaches to the cellular network indicated by the first handover command, receive an Internet Protocol (IP) address of the UE in the cellular network, and implement a handover from the WLAN to the cellular network.

In a first possible implementation manner of the twelfth aspect, the second receiver is specifically configured to: receive, by using user plane signaling, the first handover command generated by the handover node; or receive, by using the Internet Protocol Security (IPsec) protocol, the Internet Key Exchange (IKE) protocol, the Extensible Authentication Protocol (EAP), or dedicated control signaling, the first handover command generated by the handover node.

With reference to the twelfth aspect or the first possible implementation manner of the twelfth aspect, in a second possible implementation manner of the twelfth aspect, if the cellular network is a Universal Mobile Telecommunications System (UMTS) or a Global System for Mobile Communications (GSM) and the first handover command includes a packet data network (PDN) identity, the second transmitter is further configured to: before the second receiver receives the Internet Protocol (IP) address of the UE in the cellular network, send, to the control node, the PDN identity or both the PDN identity and a preset parameter that carries a UE identity, so that after finding a cellular network handover preparation context corresponding to the acquired UE identity, the control node sets a first handover instruction and sends the first handover instruction to a mobility management device, and the mobility management device instructs a PGW to allocate the IP address of the UE in the cellular network to the UE, where the preset parameter is an access point name APN or a protocol configuration option PCO, and the IP address of the UE in the cellular network is the same as an IP address of the UE in the WLAN.

With reference to the twelfth aspect or the first possible implementation manner of the twelfth aspect, in a third possible implementation manner of the twelfth aspect, the second transmitter is further configured to add a UE identity into radio resource control RRC information and send the RRC information to the control node; or the second receiver is further configured to receive an identity request sent by the control node, and the second transmitter is further configured to feed back the UE identity to the control node according to the identity request received by the second receiver.

According to a thirteenth aspect, an embodiment provides a handover apparatus, where the apparatus is used in a handover node, and the apparatus includes: a third receiver, configured to receive first handover information sent by a control node, where the first handover information is generated when the control node acquires first state information of a wireless local area network access point (WLAN AP) that user equipment UE accesses and second state information of a cellular network corresponding to a location of the UE and it is determined that the first state information and the second state information meet a preset first handover condition. Also included is a third processor, configured to generate a first handover command according to the first handover information received by the third receiver; and a third transmitter, configured to send the first handover command generated by the third processor to the UE, so that the UE receives the first handover command that is generated according to the first handover information by the handover node, attaches to the cellular network indicated by the first handover command, receives an Internet Protocol (IP) address of the UE in the cellular network, and implements a handover from the WLAN to the cellular network.

In a first possible implementation manner of the thirteenth aspect, the third transmitter is specifically configured to: send the first handover command to the UE by using user plane signaling; or send the first handover command to the UE by using the Internet Protocol Security (IPsec) protocol, the Internet Key Exchange (IKE) protocol, the Extensible Authentication Protocol EAP, or dedicated control signaling.

With reference to the thirteenth aspect or the first possible implementation manner of the thirteenth aspect, in a second possible implementation manner of the thirteenth aspect, the third receiver is further configured to: before receiving the first handover information sent by the control node, acquire the location of the UE by using the user plane signaling; or acquire the location of the UE by using the IPsec, the IKE, the EAP, or the dedicated control signaling; and the third transmitter is further configured to send the location acquired by the third receiver to the control node, so that after acquiring the location, the control node acquires the first state information of the WLAN AP that the UE accesses and the second state information of the cellular network corresponding to the location.

With reference to the thirteenth aspect or the first possible implementation manner of the thirteenth aspect, in a third possible implementation manner of the thirteenth aspect, the third receiver is further configured to: before receiving the first handover information sent by the control node, acquire, by using the user plane signaling, a UE identity and acquire a packet data network PDN identity; or acquire, by using the IPsec, the IKE, the EAP, or the dedicated control signaling, a UE identity and acquire a PDN identity; and the third transmitter is further configured to send the UE identity and the PDN identity that are acquired by the third receiver to the control node, so that the control node establishes a cellular network handover preparation context according to the UE identity and the PDN identity.

According to a fourteenth aspect, an embodiment provides a control apparatus, where the apparatus is used in a control node, and the apparatus includes a first receiver, configured to acquire first state information of a wireless local area network access point WLAN AP corresponding to a location of user equipment UE and second state information of a cellular network that the UE accesses. Also included is a first processor, configured to: if it is determined that the first state information and the second state information that are received by the first receiver meet a preset second handover condition, generate second handover information; and a first transmitter, configured to instruct a preset node to send, to the UE, a second handover command that is generated according to the second handover information by the first processor, so that the UE accesses the WLAN AP indicated by the second handover command, receives an Internet Protocol IP address of the UE in the WLAN, and implements a handover from the cellular network to the WLAN.

In a first possible implementation manner of the fourteenth aspect, the first receiver is specifically configured to: acquire the location of the UE; search for an access controller AC/a broadband network gateway BNG of a WLAN AP that is corresponding to a coverage area to which the location belongs or corresponding to a coverage area adjacent to a coverage area to which the location belongs, and acquire the first state information of the WLAN AP from the AC/BNG; and acquire the second state information of the cellular network that the UE accesses.

With reference to the fourteenth aspect or the first possible implementation manner of the fourteenth aspect, in a second possible implementation manner of the fourteenth aspect, the first receiver is specifically configured to acquire a UE identity, an identifier of the WLAN AP, and a packet data network PDN identity; and the first processor is further configured to add the UE identity, the identifier of the WLAN AP, and the PDN identity that are acquired by the first receiver into the second handover information, where the UE identity and the PDN identity are used to generate notification information, and the identifier of the WLAN AP is used to generate the second handover command.

With reference to the second possible implementation manner of the fourteenth aspect, in a third possible implementation manner of the fourteenth aspect, the first processor is further configured to: after generating the second handover information, add, into the notification information, the UE identity and the PDN identity that are carried in the second handover information; and the first transmitter is further configured to: send the notification information generated by the first processor to a trusted gateway TGW; or send the notification information generated by the first processor to a mobility control function-wireless local area network MCF-W, and the MCF-W forwards the notification information to the TGW, so that the TGW establishes a WLAN handover preparation context according to the UE identity and the PDN identity, and after finding a WLAN handover preparation context corresponding to a UE identity of UE that performs WLAN AP access authentication, determines a packet data network gateway PGW according to the WLAN handover preparation context and subscription information of the UE and sends a handover instruction to the PGW, and the PGW returns, to the TGW according to the handover instruction, the IP address that is of the UE in the WLAN and allocated to the UE, where the IP address of the UE in the WLAN is the same as an IP address of the UE in the cellular network.

According to a fifteenth aspect, an embodiment provides a user apparatus, where the apparatus is used in user equipment UE. The apparatus includes: a second receiver, configured to receive a second handover command that is generated according to second handover information, where the second handover information is generated when a control node acquires first state information of a wireless local area network access point (WLAN AP) corresponding to a location of the UE and second state information of a cellular network that the UE accesses and it is determined that the first state information and the second state information meet a preset second handover condition. Also included is a second processor, configured to access the WLAN AP indicated by the second handover command received by the second receiver, where the second receiver is further configured to: after the second processor accesses the WLAN AP indicated by the second handover command, receive an Internet Protocol IP address of the UE in the WLAN, and implement a handover from the cellular network to the WLAN.

In a first possible implementation manner of the fifteenth aspect, the apparatus further includes: a second transmitter, configured to: before the second receiver receives the second handover command that is generated according to the second handover information, report the location of the UE to the control node, so that after acquiring the location, the control node acquires the first state information of the WLAN AP corresponding to the location and the second state information of the cellular network that the UE accesses.

With reference to the fifteenth aspect or the first possible implementation manner of the fifteenth aspect, in a second possible implementation manner of the fifteenth aspect, the second transmitter is further configured to: before the second receiver receives the second handover command that is generated according to the second handover information, report a UE identity to the control node, where the UE identity is added into notification information and sent to a trusted gateway TGW by the control node, so that the TGW establishes a WLAN handover preparation context according to the UE identity and a packet data network PDN identity that is added by the control node into the notification information, and after finding a WLAN handover preparation context corresponding to a UE identity of UE that performs WLAN AP access authentication, determines a packet data network gateway PGW according to the WLAN handover preparation context and subscription information of the UE and sends a handover instruction to the PGW, and the PGW returns, to the TGW according to the handover instruction, the IP address that is of the UE in the WLAN and allocated to the UE, where the IP address of the UE in the WLAN is the same as an IP address of the UE in the cellular network.

According to a sixteenth aspect, an embodiment provides a control node, where the control node includes the control apparatus according to the sixth aspect; or the control node includes the control apparatus according to the ninth aspect.

According to a seventeenth aspect, an embodiment provides user equipment UE, where the UE includes the user apparatus according to the seventh aspect; or the UE includes the user apparatus according to the tenth aspect.

According to an eighteenth aspect, an embodiment provides a handover node, where the handover node includes the handover apparatus according to the eighth aspect.

According to a nineteenth aspect, an embodiment provides a control node, where the control node includes the control apparatus according to the eleventh aspect; or the control node includes the control apparatus according to the fourteenth aspect.

According to a twentieth aspect, an embodiment provides user equipment (UE), where the UE includes the user apparatus according to the twelfth aspect; or the UE includes the user apparatus according to the fifteenth aspect.

According to a twenty-first aspect, an embodiment provides a handover node, where the handover node includes the handover apparatus according to the thirteenth aspect.

According to a twenty-second aspect, an embodiment provides a network handover system, where the system includes the control apparatus according to the sixteenth aspect, the user equipment (UE) according to the seventeenth aspect, and the handover node according to the eighteenth aspect; or the system includes the control apparatus according to the nineteenth aspect, the user equipment (UE) according to the twentieth aspect, and the handover node according to the twenty-first aspect.

A beneficial effect of the technical solutions provided in the embodiments is as follows. First state information of a wireless local area network access point (WLAN AP) that user equipment (UE) accesses and second state information of a cellular network corresponding to a location of the UE are acquired; if it is determined that the first state information and the second state information meet a preset first handover condition, first handover information is generated; and the first handover information is sent to a handover node, so that the handover node sends, to the UE, a first handover command that is generated according to the first handover information, and the UE attaches to the cellular network indicated by the first handover command, receives an Internet Protocol (IP) address of the UE in the cellular network, and implements a handover from the WLAN to the cellular network. A handover occasion can be determined according to state information of the cellular network and the WLAN, and therefore effects of improving accuracy of a network handover and reducing complexity of the network handover are achieved by resolving a problem that because states of the cellular network and the WLAN cannot be acquired before the UE decides by itself to perform a network handover, the UE cannot determine the handover occasion according to the states, which not only reduces accuracy of a network handover, but also increases complexity of the network handover.

BRIEF DESCRIPTION OF THE DRAWINGS

To describe the technical solutions in the embodiments of the present invention more clearly, the following briefly introduces the accompanying drawings required for describing the embodiments. Apparently, the accompanying drawings in the following description show merely some embodiments of the present invention, and a person of ordinary skill in the art may still derive other drawings from these accompanying drawings without creative efforts.

DETAILED DESCRIPTION OF ILLUSTRATIVE EMBODIMENTS

Figure 1:
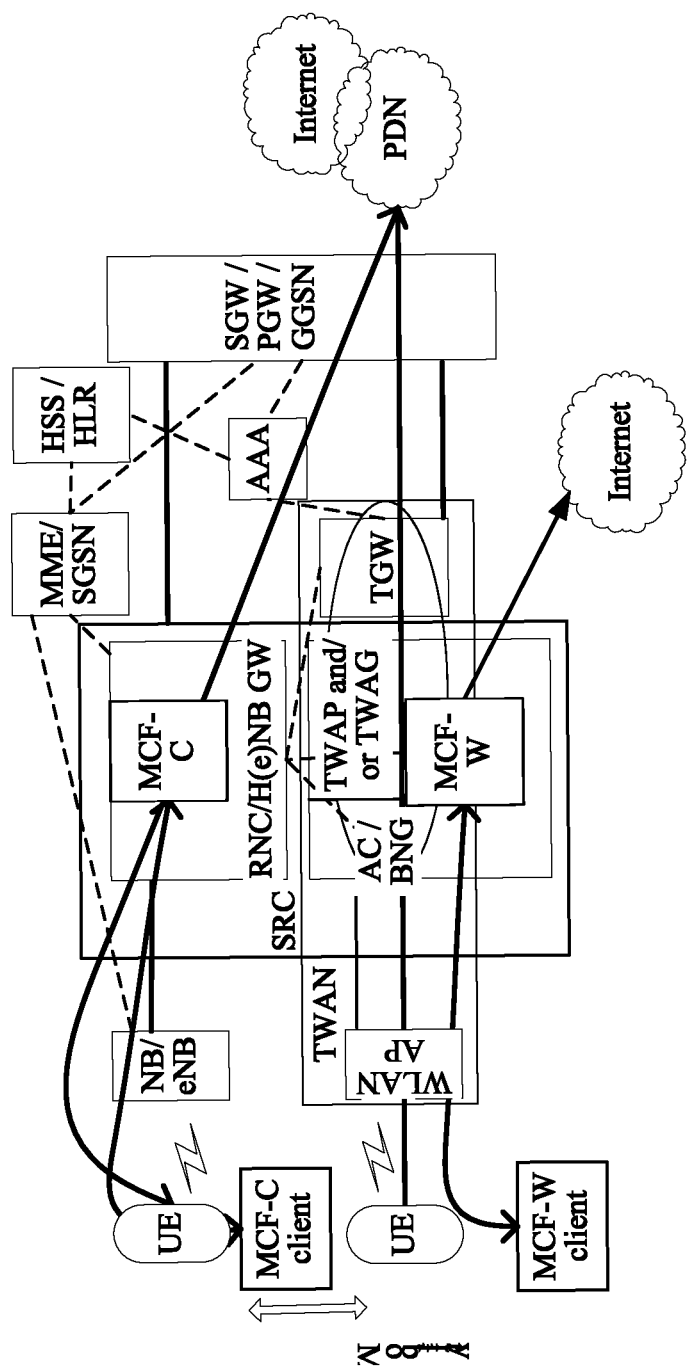
FIG. 1 is a schematic architecture diagram of a network handover system according to an embodiment.

To make the objectives, technical solutions, and advantages of the present invention clearer, the following further describes the embodiments of the present invention in detail with reference to the accompanying drawings.

A TWAN (Trusted WLAN Access Network) includes a WLAN AP (Access Point), a TWAP (Trusted WLAN AAA Proxy), and a TWAG (Trusted WLAN Access Gateway). Referring to a schematic architecture diagram of a network handover system shown in FIG. 1, authentication and authorization functions of an AC (Access Controller)/a BNG (Broadband Network Gateway) and a TGW (Trusted Gateway) to UE are corresponding to the TWAP, and a user plane management function of the AC/BNG and the TGW to the UE is corresponding to the TWAG. Specifically, an AAA (Authentication, Authorization and Accounting) server acquires subscription information of the UE from an HSS (Home Subscriber Server)/HLR (Home Location Register), the TGW acquires the subscription information from the AAA server, and the AC/BNG connects to the TGW by using a DIAMETER/RADIUS (Remote Authentication Dial In User Service) interface and works with the AAA server and the HSS/HLR to complete authentication and authorization on the UE.

An MCF-C (Mobility Control Function-Cellular) is located in a cellular network and may perform user plane interaction with an MCF-C client in UE. In this case, the MCF-C may be an independent entity on an Iu/S1 interface or may be integrated into an RNC (Radio Network Controller), an SRC (Single Radio Controller), or an eNB (Evolved NodeB)/HeNB (Home eNB or Home NB, home evolved NodeB or home NodeB)/HeNB GW (Home eNB Gateway or Home NB Gateway, home evolved NodeB gateway or home NodeB gateway). Alternatively, the MCF-C may also perform control plane interaction with the UE, for example, the UE and the MCF-C interact by using air interface RRC (Radio Resource Control) information and an S1 (LTE) or Iu (UMTS) interface between a cellular access network and a core network. In this case, the MCF-C may also be located in an MME (Mobility Management Entity)/SGSN.

An MCF-W (Mobility Control Function-WLAN) may perform user plane interaction with an MCF-W client in the UE, and the MCF-W is located between the AC/BNG and the TGW or may be integrated into the AC/BNG or the TGW. If the AC/BNG and the TGW are integrated to form TWAG+TWAP, the MCF-W is integrated into the TWAG/TWAP. Alternatively, the MCF-W may also perform control plane interaction with the UE. For example, the UE and the MCF-W may interact by using IKE (Internet Key Exchange) of IPsec (IP Security Tunnel), or by using EAP (Extensible Authentication Protocol), or by using dedicated control plane signaling between the UE and the TWAG, or by using IEEE ("Institute of Electrical and Electronics Engineers, Institute of Electrical and Electronics Engineers) 802.11 information, where the information may be included in a management frame. In this case, the MCF-W may also be located in the MME/SGSN.

The SRC may be an RNC, a BSC (Base Station Controller, base station controller), an HeNB GW, a coordinator that connects to an access network using a different access technology, or an integrated device of at least one of the foregoing devices, where a control function of the SRC may also be located in the MME. The SRC may further have an interface to one or more of the MCF-C, the MCF-W, the AC/BNG, or the TGW, and at least one of the foregoing devices may be integrated.

Further, if the cellular network is a UMTS or a GSM, FIG. 1 may further include an SGSN; if the cellular network is LTE, FIG. 1 may further include an MME. The foregoing MME/SGSN or the TGW may further access a PDN or the Internet by using an SGW/a PGW/a GGSN (Gateway GPRS Support Node).

Figure 2:
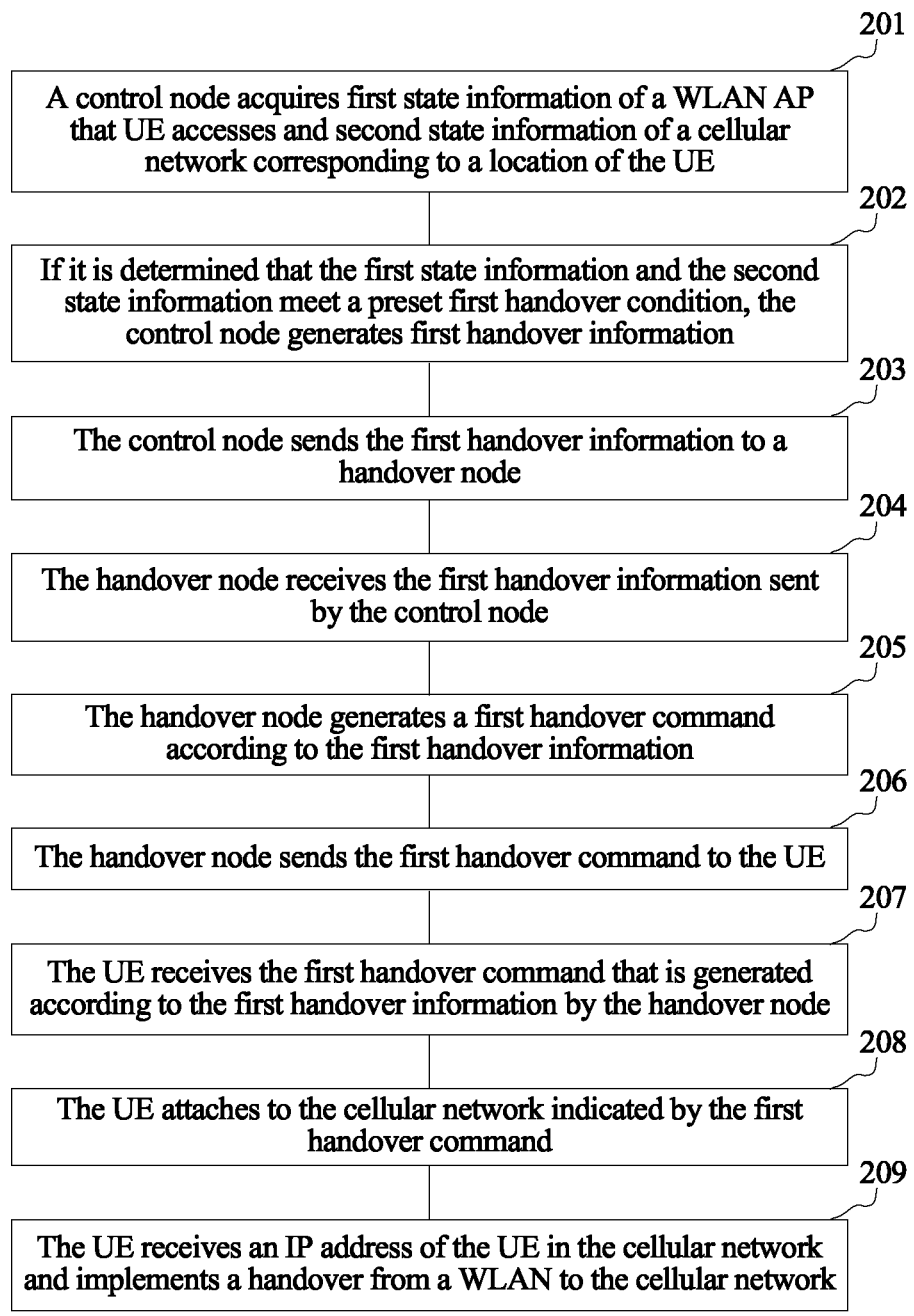
FIG. 2 is a method flowchart of a network handover method according to an embodiment.

Referring to FIG. 2, FIG. 2 is a method flowchart of a network handover method according to an embodiment of the present invention, and the network handover method is a method for a handover from a WLAN to a cellular network. The network handover method may include:

Step 201: A control node acquires first state information of a WLAN AP that UE accesses and second state information of a cellular network corresponding to a location of the UE.

In this embodiment, the control node is a node that controls the UE to perform a handover between a WLAN and a cellular network, and the control node may be an SRC or the like.

The control node can acquire state information of both a WLAN that the UE currently accesses and a cellular network to which the UE is to be handed over, and determine, according to the state information, whether the UE needs to perform a network handover. Therefore, an effect of improving accuracy of a network handover is achieved by resolving a problem that because the UE decides by itself to perform a network handover, states of the cellular network and the WLAN cannot be acquired, and consequently the UE cannot determine a handover occasion according to the states.

Step 202: If it is determined that the first state information and the second state information meet a preset first handover condition, the control node generates first handover information.

The control node may set the first handover condition and detect whether the first state information and the second state information meet the first handover condition. If the control node detects that the first state information and the second state information meet the first handover condition, the control node proceeds to perform step 203; or if the control node detects that the first state information and the second state information do not meet the first handover condition, the control node keeps acquiring the first state information and the second state information, or ends the process.

Specifically, the first handover information may include an access instruction, a UE identity, and a cellular network identifier. The access instruction may be a handover instruction or a concurrent access instruction and is used to instruct to perform a handover. The UE identity may be an IMSI (International mobile subscriber identity, international mobile subscriber identity) and is used to indicate UE on which a handover is performed. The cellular network identifier is an identifier of the cellular network to be accessed by the UE, and is used to indicate a cellular network to be accessed by the UE.

Step 203: The control node sends the first handover information to a handover node.

The handover node may be an MCF-W.

Step 204: The handover node receives the first handover information sent by the control node.

Step 205: The handover node generates a first handover command according to the first handover information.

The handover node may add, into the first handover command, the access instruction and the cellular network identifier that are carried in the first handover information.

Step 206: The handover node sends the first handover command to the UE.

Step 207: The UE receives the first handover command that is generated according to the first handover information by the handover node.

Step 208: The UE attaches to the cellular network indicated by the first handover command.

The UE may read the cellular network identifier carried in the first handover command, and attach to the cellular network indicated by the cellular network identifier. A process in which the UE attaches to the cellular network belongs to the prior art, and details are not described herein again.

Step 209: The UE receives an IP address of the UE in the cellular network and implements a handover from a WLAN to the cellular network.

In this embodiment, after attaching to the cellular network, the UE may further receive the IP address of the UE in the cellular network, and in this case, a process of a handover from the WLAN to the cellular network is completed.

In conclusion, according to the network handover method provided in this embodiment, first state information of a wireless local area network access point WLAN AP that user equipment UE accesses and second state information of a cellular network corresponding to a location of the UE are acquired; if it is determined that the first state information and the second state information meet a preset first handover condition, first handover information is generated; and the first handover information is sent to a handover node, so that the handover node sends, to the UE, a first handover command that is generated according to the first handover information, and the UE attaches to the cellular network indicated by the first handover command, receives an Internet Protocol (IP) address of the UE in the cellular network, and implements a handover from the WLAN to the cellular network. A handover occasion can be determined according to state information of the cellular network and the WLAN, and therefore effects of improving accuracy of a network handover and reducing complexity of the network handover are achieved by resolving a problem that because states of the cellular network and the WLAN cannot be acquired before the UE decides by itself to initiate a network handover, the UE cannot determine the handover occasion according to the states, which not only reduces accuracy of a network handover, but also increases complexity of the network handover.

Figure 3:
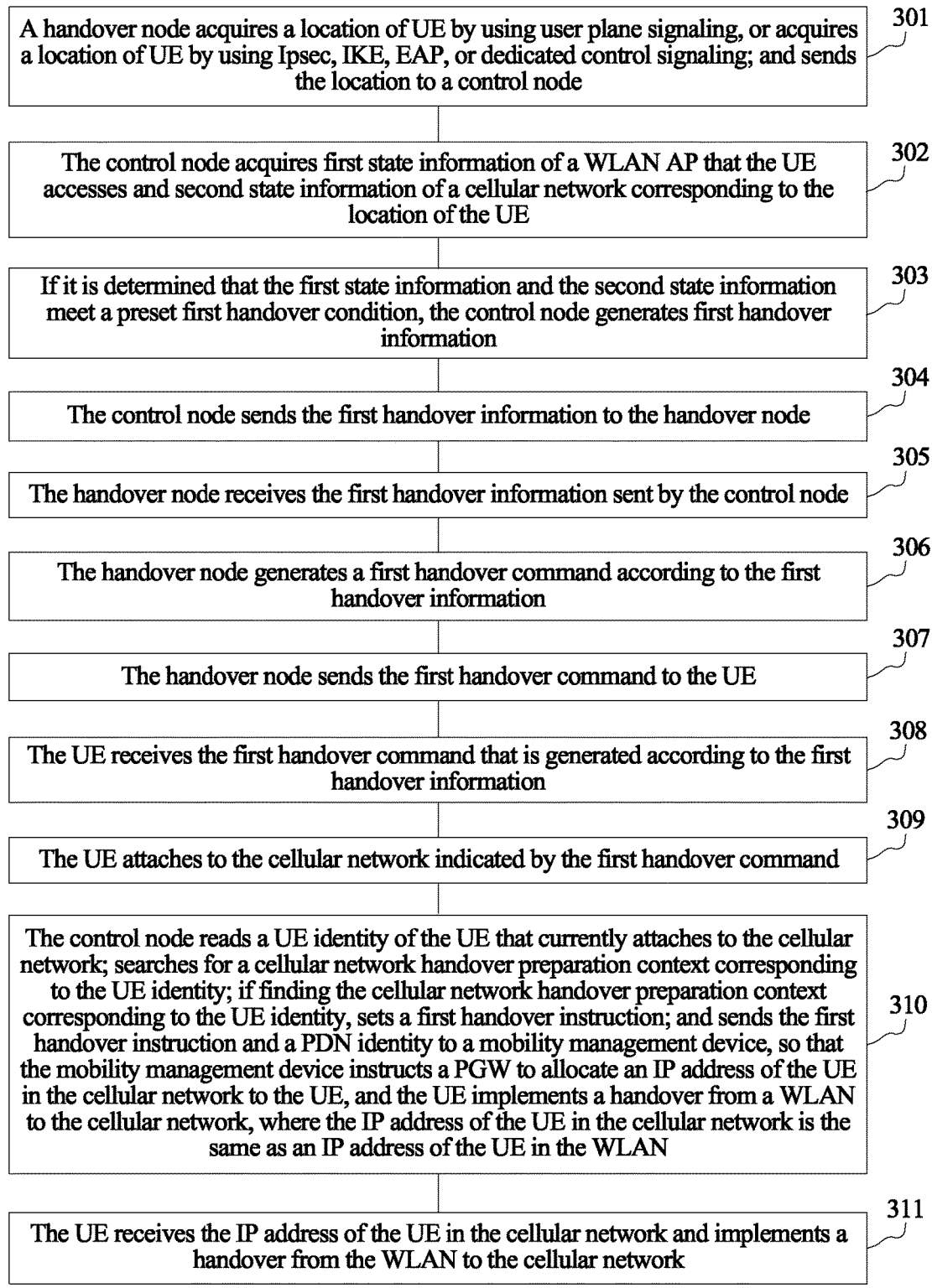
FIG. 3 is a method flowchart of a network handover method according to another embodiment.

Referring to FIG. 3, FIG. 3 is a method flowchart of a network handover method according to another embodiment, and the network handover method is a method for a handover from a WLAN to a cellular network. The network handover method may include the following steps.

Step 301: A handover node acquires a location of UE by using user plane signaling, or acquires a location of UE by using IPsec, IKE, EAP, or dedicated control signaling; and sends the location to a control node.

In this embodiment, the handover node may acquire the location of the UE by using control plane signaling, or may acquire the location of the UE by using the IPsec, the IKE, the EAP, or the dedicated control signaling. If the handover node acquires the location of the UE by using the user plane signaling, the handover node further needs to establish a user plane connection to the UE. The UE establishes the user plane connection to the handover node by using many methods, and in this embodiment, an example in which the UE establishes the user plane connection to the handover node by sending an IP packet is used for description.

For example, the UE may identify in advance an IP packet that is used to establish the user plane connection to the handover node, for example, set a destination address to a specific address (for example, 192.168.254.254) or set a port number to a specific UDP (User Datagram Protocol) port number (for example, 8008). After the UE sends the IP packet, the handover node executes an SPI (Shallow Packet Inspection) to check an IP packet; and after intercepting the IP packet with the specific address or the specific port number, the handover node queries a TGW according to a source address of the IP packet and performs comparison with a link of the UE, so as to verify validity of the IP packet, for example, whether the IP packet is sent by UE that has passed access authentication. After the handover node determines that the IP packet is valid, the handover node sends, to the UE, an IP packet used for replying, and after the UE receives the IP packet used for replying, it is determined that establishment of the user plane connection is successful.

To facilitate verification on the UE and the IP packet, the IP packet may further carry a UE identity of the UE, for example, an IMSI (International mobile subscriber identity), in a process of interacting with the handover node. The UE may interact with the handover node many times to establish the user plane connection.

Further, when a network handover is performed on the UE, all data flows of the UE may be transferred, that is, handover access is performed on the UE; or some data flows of the UE may be transferred, that is, concurrent access is performed on the UE. Because the concurrent access requires functional support of the UE, when establishing the user plane connection to the handover node, the UE may further report whether the UE supports data concurrency, so that the handover access or the concurrent access is subsequently performed on the UE according to the capability.

Specifically, the location of the UE that is acquired by the handover node may be at least one of the following information of a WLAN that the UE accesses: an SSID (service set identifier), a BSSID (basic service set identifier), and an HESSID (Homogenous Extended Service Set Identifier). If the UE has attached to or once attached to the cellular network, the location of the UE may further include at least one of a CGI (Cell Global Identification), an LAI (Location Area Identity), and an (old) RAI (Routing Area Identity) of the cellular network to which the UE has attached or once attached, and is used for a handover to the cellular network.

In this embodiment, the control node is a node that controls the UE to perform a handover between a WLAN and a cellular network, and the control node may be an SRC or the like. The handover node is a node used by the UE to perform a handover between a WLAN and a cellular network, and the handover node may be an MCF-W or the like.

Step 302: The control node acquires first state information of a WLAN AP that the UE accesses and second state information of a cellular network corresponding to the location of the UE.

The control node can acquire state information of both a WLAN that the UE currently accesses and a cellular network to which the UE is to be handed over, and determine, according to the state information, whether the UE needs to perform a network handover. Therefore, an effect of improving accuracy of a network handover is achieved by resolving a problem that because the UE decides by itself to perform a network handover, states of the cellular network and the WLAN cannot be acquired, and consequently the UE cannot determine a handover occasion according to the states.

After acquiring the location of the UE that is sent by the handover node, the control node may acquire the first state information and the second state information according to the location. Specifically, that the control node acquires first state information of a WLAN AP that the UE accesses and second state information of a cellular network corresponding to the location of the UE may include: acquiring the location of the UE; determining, according to the location, an AC/a BNG of a WLAN that the UE accesses, and acquiring the first state information of the WLAN AP from the AC/BNG; and searching for the second state information of the cellular network corresponding to the location of the UE, where the cellular network corresponding to the location of the UE is: a cellular network to which the UE connects, or a cellular network that the UE camps on, or a cellular network corresponding to a coverage area to which the location belongs, or a cellular network corresponding to a coverage area adjacent to a coverage area to which the location belongs.

After acquiring the location of the UE, the control node may determine the AC/BNG of the WLAN that the UE accesses, and acquire the first state information of the WLAN AP from the AC/BNG. There is at least one WLAN AP, and the first state information may include at least one of air interface and AP load, a frequency channel number, transmit power, and transmission load.

After acquiring the location of the UE, the control node may acquire the second state information of the cellular network corresponding to the location of the UE. The cellular network corresponding to the location of the UE is: a cellular network to which the UE connects, or a cellular network that the UE camps on, or a cellular network corresponding to a coverage area to which the location belongs, or a cellular network corresponding to a coverage area adjacent to a coverage area to which the location belongs. The second state information may include at least one of an air interface load, device load, and transmission load.

When the location of the UE changes, the control node may re-acquire the location of the UE that is sent by the handover node. The control node may re-determine, according to the acquired location of the UE, the AC/BNG of the WLAN that the UE accesses, and re-acquire the first state information. Likewise, the UE may re-acquire the second state information of the cellular network. In addition, a sequence in which the control node acquires the first state information and the second state information is not limited in this embodiment.

Step 303: If it is determined that the first state information and the second state information meet a preset first handover condition, the control node generates first handover information.

For details about a process in which the control node determines whether the first state information and the second state information meet the first handover condition, refer to a description in step 202, and details are not described herein again.

The first handover information may include an access instruction, a UE identity, and a cellular network identifier. The access instruction may be a handover instruction or a concurrent access instruction and is used to instruct the handover node to perform a handover. The UE identity may be an IMSI, or the UE identity may be an identity that is pre-allocated and sent to the UE by the handover node. If the cellular network is a UMTS or a GSM, the UE identity may further be a P-TMSI; if the cellular network is LTE, the UE identity may further be an S-TMSI and is used to indicate UE on which a handover is performed. The cellular network identifier is an identifier of the cellular network to be accessed by the UE, and is used to indicate a cellular network to be accessed by the UE.

Preferably, the control node may further acquire a PDN identity of a PDN connection that is activated in the WLAN by the UE, and add the PDN identity into the first handover information, so that after acquiring the PDN identity from the control node, a PGW allocates an IP address of the UE in the cellular network to the UE according to the PDN identity, and the IP address of the UE in the cellular network is the same as an IP address of the UE in the WLAN. Because the IP address of the UE does not change after the network handover, an upper-layer application may be shielded from a change of an underlying access technology caused by the handover, thereby implementing a seamless handover. The PDN identity is used to indicate a PDN connection to be reserved for the UE.

In this embodiment, the control node may acquire the UE identity and the PDN identity by using the handover node. Specifically, the method may further include: acquiring, by the handover node by using the user plane signaling, the UE identity and acquiring the packet data network PDN identity, or acquiring, by using the IPsec, the IKE, the EAP, or the dedicated control signaling, the UE identity and acquiring the PDN identity; and sending the UE identity and the PDN identity to the control node, so that the control node establishes a cellular network handover preparation context according to the UE identity and the PDN identity.

It should be additionally noted that if the IP address of the UE in the WLAN needs to be reserved, after the control node determines that the first state information and the second state information meet the preset first handover condition, the method may further include: acquiring the UE identity and establishing the cellular network handover preparation context according to the UE identity; or after it is determined that the first state information and the second state information meet the preset first handover condition, the method may further include: acquiring the UE identity and the PDN identity and establishing the cellular network handover preparation context according to the UE identity and the PDN identity; if the IP address of the UE in the WLAN does not need to be reserved, the control node does not need to establish the cellular network handover preparation context.

In this embodiment, the control node may establish the cellular network handover preparation context immediately after receiving the information sent by the handover node, where the cellular network handover preparation context is used to perform a network handover on the UE. If the information carries the UE identity, the control node establishes the cellular network handover preparation context according to the UE identity; if the information carries the UE identity and the PDN identity, the control node establishes the cellular network handover preparation context according to the UE identity and the PDN identity.

When the control node establishes the cellular network handover preparation context according to the UE identity or both the UE identity and the PDN identity, a handover preparation timer is enabled; before expiration of the timer, the cellular network waits to be accessed by the UE, for performing a network handover on the UE. A value of the handover preparation timer may be configured by a network, or may be delivered by an MCF-C or the SRC. After the handover preparation timer expires, the control node deletes the cellular network handover preparation context of the UE.

Further, the handover node may further send a target standard of the cellular network to the control node, where the target standard may be a UMTS, a GSM, or LTE; the control node may further add the target standard of the cellular network into the first handover information, so that the UE performs a corresponding handover operation according to the target standard.

Step 304: The control node sends the first handover information to the handover node.

Step 305: The handover node receives the first handover information sent by the control node.

Step 306: The handover node generates a first handover command according to the first handover information.

After receiving the first handover information, the handover node may add, into the first handover command, the cellular network identifier carried in the first handover information. Further, the handover node may further add at least one of the access instruction, the target standard of the cellular network, and the UE identity into the first handover command, and send the first handover command to the UE, so as to instruct the UE to perform a network handover. Preferably, if the first handover information carries the PDN identity, the handover node may further add the PDN identity into the first handover command.

Step 307: The handover node sends the first handover command to the UE.

Specifically, that the handover node sends the first handover command to the UE may include: sending, by using the user plane signaling, the first handover command to the UE; or sending, by using the IPsec, the IKE, the EAP, or the dedicated control signaling, the first handover command to the UE.

Step 308: The UE receives the first handover command that is generated according to the first handover information by the handover node.

Specifically, the receiving the first handover command that is generated according to the first handover information by the handover node may include: receiving, by using the user plane signaling, the first handover command generated by the handover node; or receiving, by using the IPsec, the IKE, the EAP, or the dedicated control signaling, the first handover command generated by the handover node.

Step 309: The UE attaches to the cellular network indicated by the first handover command.

The UE may read the cellular network identifier carried in the first handover command, and attach to the cellular network indicated by the cellular network identifier. Specifically, if the UE is in an idle state in the cellular network, the UE establishes an RRC connection to the cellular network. If the UE has not performed a GPRS attach, the UE may send a NAS information (attach request) to the cellular network, and after the cellular network authenticates the UE, the cellular network returns a NAS information attach accept (Attach Accept) to the UE. NAS information is carried in RRC information of the UE and a cellular network. The SRC can obtain the IMSI or the P-TMSI and the old RAI of the UE by parsing the NAS information.

In this embodiment, if the IP address of the UE in the WLAN does not need to be reserved, after the UE attaches to the cellular network, the control node sends the UE identity to a mobility management device, and the mobility management device sends the UE identity to the PGW, so that the PGW allocates an IP address to the UE, where the IP address is different from the IP address of the UE in the WLAN, and the control node proceeds to perform step 311; if the IP address of the UE in the WLAN needs to be reserved, the control node proceeds to perform step 310.

Step 310: The control node reads a UE identity of the UE that currently attaches to the cellular network; searches for a cellular network handover preparation context corresponding to the UE identity; after finding the cellular network handover preparation context corresponding to the UE identity, sets a first handover instruction; and sends the first handover instruction and a PDN identity to a mobility management device, so that the mobility management device instructs a PGW to allocate an IP address of the UE in the cellular network to the UE, and the UE implements a handover from a WLAN to the cellular network, where the IP address of the UE in the cellular network is the same as an IP address of the UE in the WLAN.

In this embodiment, if the IP address of the UE in the WLAN needs to be reserved, the control node may search for the cellular network handover preparation context according to the UE identity, and after finding the cellular network handover preparation context corresponding to the UE identity, set the first handover instruction, so as to instruct the PGW to reserve the IP address of the UE in the WLAN for the UE.

Therefore, the control node may further read the UE identity of the UE that currently attaches to the cellular network; search for the cellular network handover preparation context corresponding to the UE identity; after finding the cellular network handover preparation context corresponding to the UE identity, set the first handover instruction; and send the first handover instruction to the mobility management device, so that the mobility management device instructs the PGW to allocate the IP address of the UE in the cellular network to the UE, and the UE implements a handover from the WLAN to the cellular network.

Specifically, the reading the UE identity of the UE that currently attaches to the cellular network may include: a. acquiring the UE identity in an attach request sent by the UE; or b. sending an identity request to the UE, and receiving a UE identity that is fed back according to the identity request by the UE; or c. acquiring the UE identity carried in a preset parameter, where the preset parameter is an APN or a PCO (Protocol Configuration Option, protocol configuration option); or d. acquiring the UE identity in the RRC information sent by the UE. b. If the cellular network is a UMTS or a GSM and the control node acquires the UE identity by sending the identity request to the UE, the method may further include: receiving, by the UE, the identity request sent by the control node, and feeding back the UE identity to the control node according to the identity request. Specifically, if the UE identity in the attach request is a P-TMSI and the control node has not received a P-TMSI that serves as the UE identity, the control node may send the identity request (IDENTITY REQUEST) to the UE and acquire an IMSI of the UE from an identity response (IDENTITY RESPONSE) returned by the UE, so as to identify the UE. c. If the cellular network is a UMTS or a GSM and the control node acquires the UE identity by using the preset parameter, the method may further include: adding, by the UE, the UE identity into the preset parameter and sending the preset parameter to the control node. Specifically, if the UE has attached to the cellular network, or has neither attached to the cellular network nor received the identity request, the UE may add the UE identity into the APN as a field or into the PCO as a parameter, or send the UE identity to the control node as a part of another parameter of the PCO, for example, by using Activate PDP Context request information. Correspondingly, after the UE identity carried in the preset parameter is acquired, the method may further include: deleting the UE identity carried in the preset parameter.

Alternatively, the control node may further add a PDN identity, and then the method may further include: sending, to the control node by the UE, the PDN identity or both the PDN identity and the preset parameter that carries the UE identity, where the preset parameter is the APN or the PCO. Specifically, the control node may add the PDN identity into the APN and send the APN by using the Activate PDP Context request information. d. If the cellular network is LTE and the control node acquires the UE identity by using the RRC information, the method may further include: adding the UE identity into the RRC information and sending the RRC information to the control node. According to a NAS information encryption mechanism in an LTE network, the control node cannot make a request to the UE to acquire the UE identity. Therefore, the UE may add the UE identity into the RRC information used for establishing an RRC connection, and the control node may acquire the UE identity from the RRC information.

After acquiring the UE identity by using the foregoing method, the control node may check whether there is a cellular network handover preparation context corresponding to the UE identity. After finding that there is a cellular network handover preparation context corresponding to the UE identity, the control node may send the first handover instruction to the mobility management device, or the control node sends the first handover instruction and the PDN identity to the mobility management device; the mobility management device generates a second handover instruction according to the first handover instruction, so that the second handover instruction instructs the PGW to allocate the IP address of the UE in the cellular network, where the IP address of the UE in the cellular network is the same as the IP address of the UE in the WLAN. After finding that there is no cellular network handover preparation context corresponding to the UE identity or that the cellular network handover preparation context has been deleted or that there is no PDN connection context in subscription information of the UE, the control node performs a normal process of establishing a PDN connection for the UE and does not perform a network handover on the UE; in this case, the IP address that is of the UE in the cellular network and allocated by the PGW to the UE is different from the IP address of the UE in the WLAN. A value of the first handover instruction may be set by the control node, for example, the control node sets a value of "Request Type" in the Activate PDP Context request information to handover or concurrency.

Specifically, the sending the first handover instruction to the mobility management device, so that the mobility management device instructs the PGW to allocate the IP address of the UE in the cellular network to the UE may include: mif the cellular network is a UMTS or a GSM, the control node sends or the control node instructs a first node to send the first handover instruction to an SGSN, so that the SGSN determines the PGW according to the first handover instruction and the subscription information of the UE and sends the second handover instruction to the PGW, and the PGW returns, to the SGSN according to the second handover instruction, the IP address that is of the UE in the cellular network and allocated to the UE; or if the cellular network is LTE, the control node sends or the control node instructs a second node to send the first handover instruction to an MME, so that the MME determines the PGW according to the first handover instruction and the subscription information of the UE and sends the second handover instruction to the PGW, and the PGW returns, to the MME according to the second handover instruction, the IP address that is of the UE in the cellular network and allocated to the UE.

The mobility management device is used to select a PGW and instruct the PGW to perform a network handover on the UE. If the cellular network is a UMTS or a GSM, the mobility management device may be an SGSN, and the first node may be an RNC. That is, if the control node is located in the RNC, the RNC may send the first handover instruction to the SGSN; if the control node is not located in the RNC, the control node may instruct the RNC to send the first handover instruction to the SGSN. If the cellular network is LTE, the mobility management device may be an MME, and the second node may be an eNB. That is, if the control node is located in the eNB, the eNB may send the first handover instruction to the MME; if the control node is not located in the eNB, the control node may instruct the eNB to send the first handover instruction to the MME.

Further, to enable the PGW to determine the UE on which a network handover is to be performed, the SGSN/MME further needs to send the UE identity together with the second handover instruction to the PGW. Specifically, the SGSN/MME may add the generated second handover instruction and the UE identity into a create session request (Create Session Request) and send the create session request to an SGW, and the SGW forwards the second handover instruction and the UE identity to the PGW; after allocating the IP address to the UE according to the second handover instruction, the PGW adds the IP address into a create session response (Create Session Response) and sends the create session response to the SGW, the SGW forwards the create session response to the SGSN/MME, and the SGSN/MME sends the IP address to the UE according to the UE identity. The second handover instruction needs to be carried in dedicated signaling for sending, which avoids a problem that a network handover cannot be performed when the UE does not support the dedicated signaling, and achieves an effect of expanding an application scope of the network handover method.

Further, when sending the first handover instruction to the mobility management device, the control node may also send the PDN identity to the mobility management device, so that the mobility management device can instruct the PGW to allocate, according to the PDN identity, the IP address to the UE, and the IP address of the UE in the cellular network is the same as the IP address of the UE in the WLAN, which shields an upper-layer application from a change of an underlying access technology caused by a handover, thereby implementing a seamless handover. Specifically, the sending the first handover instruction and the PDN identity to the mobility management device, so that the mobility management device instructs the PGW to allocate the IP address of the UE in the cellular network to the UE may include: if the cellular network is a UMTS or a GSM, the control node sends or the control node instructs the first node to send the first handover instruction and the PDN identity that is carried in the cellular network handover preparation context to the SGSN, so that the SGSN determines the PGW according to the first handover instruction, the PDN identity, and the subscription information of the UE and sends the second handover instruction and the PDN identity to the PGW, and the PGW returns, to the SGSN according to the second handover instruction and the PDN identity, the IP address that is of the UE in the cellular network and allocated to the UE; or if the cellular network is LTE, the control node sends or the control node instructs the second node to send the first handover instruction and the PDN identity that is carried in the cellular network handover preparation context to the MME, so that the MME determines the PGW according to the first handover instruction, the PDN identity, and the subscription information of the UE and sends the second handover instruction and the PDN identity to the PGW, and the PGW returns, to the MME according to the second handover instruction and the PDN identity, the IP address that is of the UE in the cellular network and allocated to the UE. The IP address of the UE in the cellular network is the same as the IP address of the UE in the WLAN.

It should be additionally noted that, that the control node sends the PDN identity to the mobility management device may include: the UE sends the PDN identity to the control node, and the control node forwards the PDN identity to the mobility management device; or when the UE does not send the PDN identity to the control node, the control node acquires the PDN identity from the cellular network handover preparation context and sends the PDN identity to the mobility management device.

Further, the SGSN/MME sends the IP address of the UE in the cellular network to the UE. For example, the SGSN may send the IP address to the UE by using NAS information, where the NAS information may be Activate PDP Context Accept information.

Step 311: The UE receives the IP address of the UE in the cellular network and implements a handover from the WLAN to the cellular network.

After completing a handover from the WLAN to the cellular network, the UE can send an uplink data packet and receive a downlink data packet by using the cellular network, so as to access a service of a PDN. If the UE establishes one PDN connection in the WLAN, all uplink and downlink data packets over the PDN connection are transferred to the cellular network for receiving or sending, and the UE may disable functions of receiving an IP packet from and sending an IP packet to the WLAN; if the UE has established at least two PDN connections in the WLAN and handover access is determined for the UE according to an instruction of the handover node and/or a local configuration, the UE selects one PDN connection and transfers all uplink and downlink data packets to the cellular network for receiving or sending. The PDN connection may be selected according to the PDN identity or according to the local configuration of the UE. A data packet in another PDN connection of the WLAN may be transferred to the cellular network for sending or receiving, or receiving or sending of the data packet may be stopped. The UE may disable the functions of receiving an IP packet from and sending an IP packet to the WLAN; if the UE has established at least two PDN connections in the WLAN and concurrent access is determined for the UE according to the instruction of the handover node and/or the local configuration, the UE selects one PDN connection and transfers all uplink and downlink data packets of the PDN connection to the cellular network for receiving or sending. The PDN may be selected according to the PDN identity or according to the local configuration of the UE. A data packet in another PDN connection of the WLAN may continue to be received or sent in the PDN connection of the WLAN.

Figure 4:
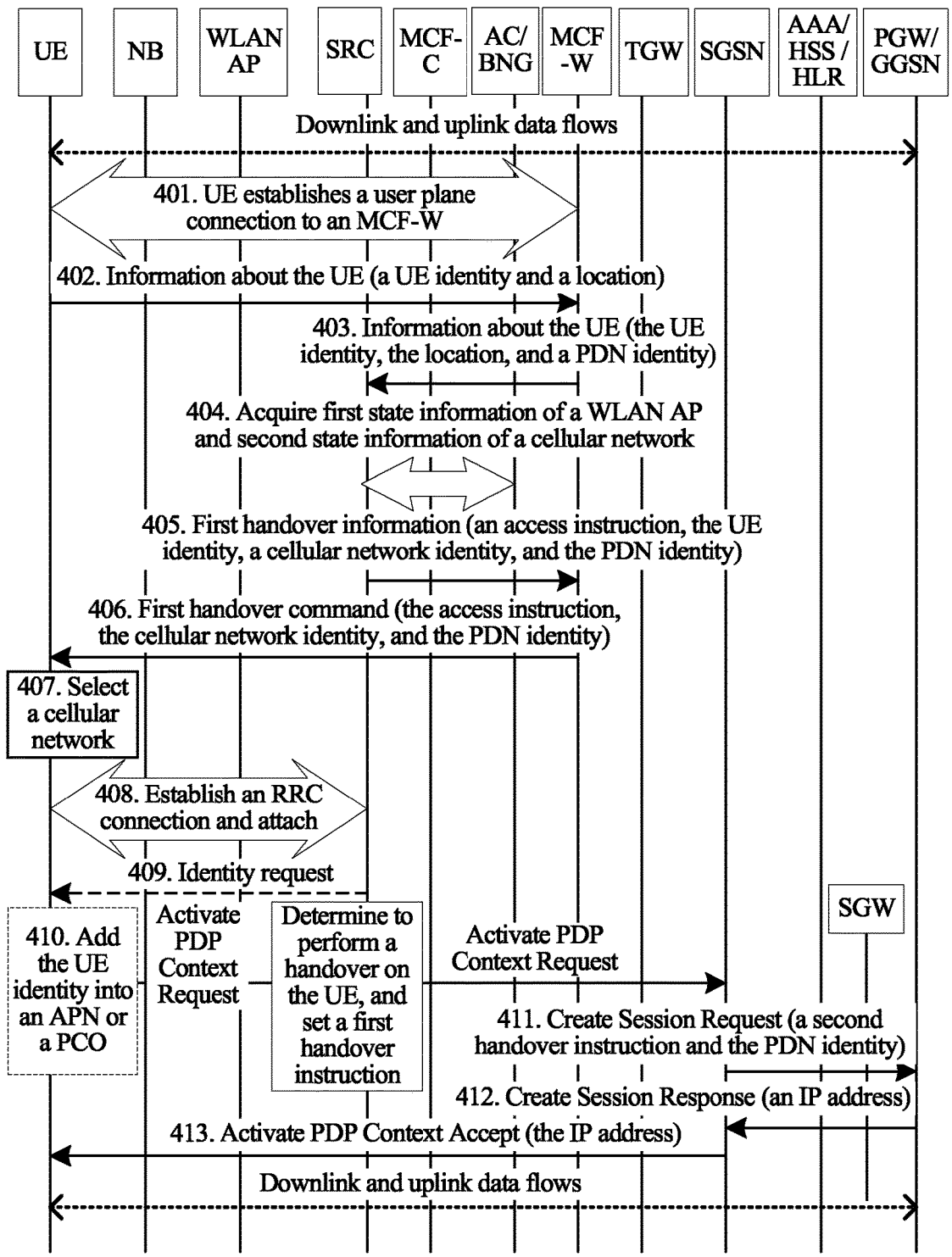
FIG. 4 is a flowchart of application of a handover from a WLAN to a cellular network according to an embodiment.

Referring to FIG. 4, this embodiment further provides a flowchart of application of the foregoing handover from a WLAN to a cellular network. An example in which the cellular network is a UMTS or a GSM, a control node is an SRC, a handover node is an MCF-W, and the handover is performed by using user plane signaling is used for description, and then a network handover process is specifically as follows.

Step 401: UE establishes a user plane connection to the MCF-W.

Step 402: The UE sends information about the UE to the MCF-W, where the information about the UE may include a UE identity and a location of the UE.

Step 403: The MCF-W sends information about the UE to the SRC, where the information about the UE may include the UE identity, the location of the UE, and a PDN identity acquired by the MCF-W.

Step 404: The SRC acquires first state information of a WLAN AP and second state information of the cellular network.

Step 405: The SRC sends first handover information to the MCF-W, where the first handover information may include an access instruction, the UE identity, a cellular network identifier, and the PDN identity.

Step 406: The MCF-W sends a first handover command to the UE, where the first handover command may include the access instruction, the cellular network identifier, and the PDN identity.

Step 407: The UE selects, according to the cellular network identifier, a cellular network to be accessed.

Step 408: The UE establishes an RRC connection and performs a GPRS attach.

Step 409: The SRC sends an identity request to the UE.

Step 410: The UE sends an Activate PDP Context request to the SRC; and the SRC determines, according to a cellular network handover preparation context and subscription information of the UE, to perform a network handover on the UE, modifies the Activate PDP Context request, and sends a modified Activate PDP Context request to an SGSN.

Specifically, that the SRC determines, according to the cellular network handover preparation context and the subscription information of the UE, to perform the network handover on the UE, and modifies the Activate PDP Context request may include: the SRC sets "Request Type" to handover or concurrency, that is, sets a first handover instruction; or the SRC deletes the UE identity carried in a preset parameter; or the SRC adds, into the Activate PDP Context request, the PDN identity in the cellular network handover preparation context.

Step 411: The SGSN sends a Create Session Request to a selected PGW, where the Create Session Request includes a second handover instruction and the PDN identity.

The SGSN generates the second handover instruction according to the first handover instruction and sends the second handover instruction to the PGW.

Step 412: The PGW returns a Create Session Response to the SGSN, where the Create Session Response includes an IP address that is of the UE in the cellular network and allocated to the UE.

Step 413: The UE acquires an IP address of the UE in the WLAN by using an Activate PDP Context Accept returned by the SGSN, and implements a handover from the WLAN to the cellular network.

In conclusion, according to the network handover method provided in this embodiment, first state information of a wireless local area network access point WLAN AP that user equipment UE accesses and second state information of a cellular network corresponding to a location of the UE are acquired; if it is determined that the first state information and the second state information meet a preset first handover condition, first handover information is generated; and the first handover information is sent to a handover node, so that the handover node sends, to the UE, a first handover command that is generated according to the first handover information, and the UE attaches to the cellular network indicated by the first handover command, receives an Internet Protocol (IP) address of the UE in the cellular network, and implements a handover from the WLAN to the cellular network. A handover occasion can be determined according to state information of the cellular network and the WLAN, and therefore effects of improving accuracy of a network handover and reducing complexity of the network handover are achieved by resolving a problem that because states of the cellular network and the WLAN cannot be acquired before the UE decides by itself to initiate a network handover, the UE cannot determine the handover occasion according to the states, which not only reduces accuracy of a network handover, but also increases complexity of the network handover. In addition, a PDN identity is sent to a PGW, so that the PGW can allocate an IP address to the UE according to the PDN identity, and the IP address of the UE does not change after a handover, which resolves a problem that a service is interrupted due to a change of the IP address of the UE after the handover, and achieves an effect of optimizing the network handover.

Figure 5:
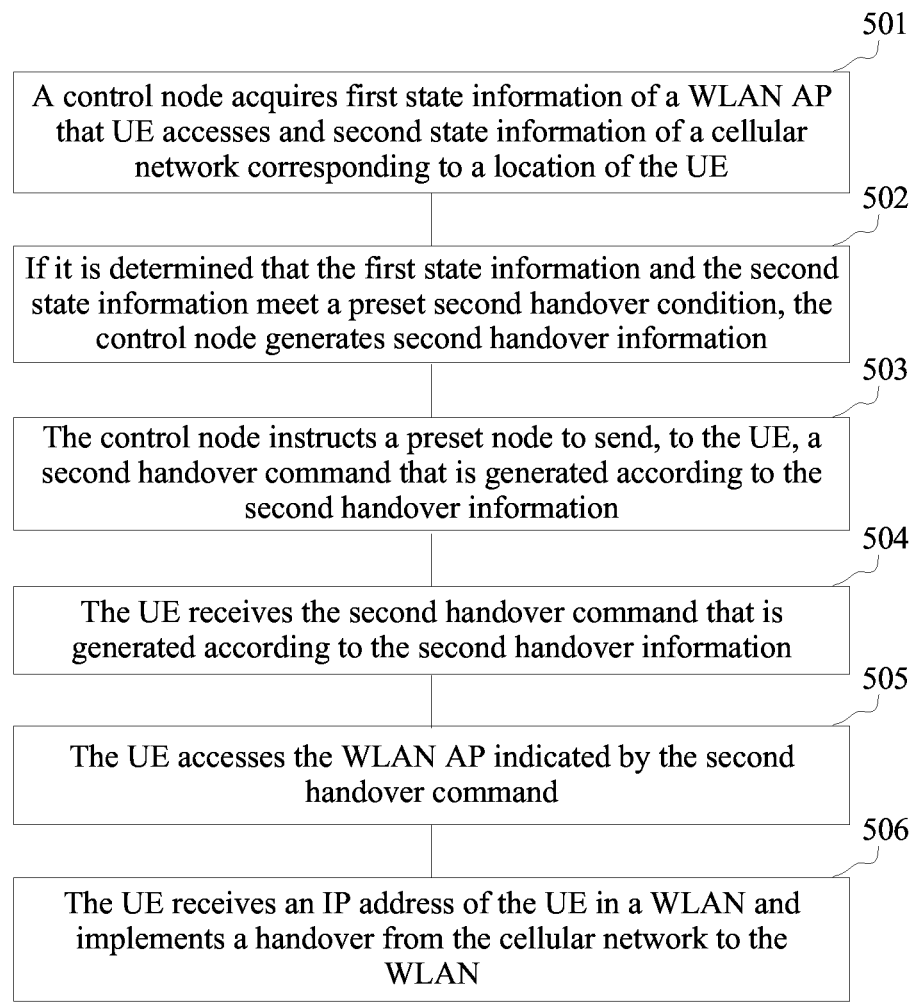
FIG. 5 is a method flowchart of a network handover method according to an embodiment.

Referring to FIG. 5, FIG. 5 is a method flowchart of a network handover method according to an embodiment, and the network handover method is a method for a handover from a cellular network to a WLAN. The network handover method may include the following steps.

Step 501: A control node acquires first state information of a WLAN AP corresponding to a location of UE and second state information of a cellular network that the UE accesses.

In this embodiment, the control node is a node that controls the UE to perform a handover between a WLAN and a cellular network. The control node may be an SRC or the like.

The control node may acquire state information of both the cellular network that the UE currently accesses and a WLAN to which the UE is to be handed over, and determine, according to the state information, whether the UE needs to perform a network handover. Therefore, an effect of improving accuracy of a network handover is achieved by resolving a problem that because the UE decides by itself to perform a network handover, states of the cellular network and the WLAN cannot be acquired, and consequently the UE cannot determine a handover occasion according to the states.

Step 502: If it is determined that the first state information and the second state information meet a preset second handover condition, the control node generates second handover information.

The control node may set the second handover condition and detect whether the first state information and the second state information meet the second handover condition. If the control node detects that the first state information and the second state information meet the second handover condition, the control node proceeds to perform step 503; or if the control node detects that the first state information and the second state information do not meet the second handover condition, the control node keeps acquiring the first state information and the second state information, or ends the process.

Specifically, the second handover information may include an access instruction, a UE identity, and an identifier of the WLAN AP. The access instruction may be a handover instruction or a concurrent access instruction and is used to instruct an MCF-C to perform a handover. The UE identity may be an IMSI and is used to indicate UE on which a handover is performed. The identifier of the WLAN AP is an identifier of a WLAN AP to be accessed by the UE, may be at least one of an SSID, a BSSID, and an HESSID, and is used to indicate a WLAN AP to be accessed by the UE.

Step 503: The control node instructs a preset node to send, to the UE, a second handover command that is generated according to the second handover information.

After determining to perform a network handover on the UE, the control node may send the second handover information to the preset node; after receiving the second handover information, the preset node generates the second handover command according to the second handover information and sends the second handover command to the UE. The preset node may be an MCF-C.

Step 504: The UE receives the second handover command that is generated according to the second handover information.

Step 505: The UE accesses the WLAN AP indicated by the second handover command.

The UE may read the identifier of the WLAN AP that is carried in the second handover command, and access the WLAN AP indicated by the identifier of the WLAN AP. A process in which the UE accesses the WLAN AP belongs to the prior art, and details are not described herein again.

Step 506: The UE receives an IP address of the UE in a WLAN and implements a handover from the cellular network to the WLAN.

In this embodiment, after accessing the WLAN, the UE may further receive the IP address that is of the UE in the WLAN and sent by a TGW, and in this case, a handover process of a handover from the cellular network to the WLAN is completed.

In conclusion, according to the network handover method provided in this embodiment, first state information of a wireless local area network access point WLAN AP corresponding to a location of user equipment UE and second state information of a cellular network that the UE accesses are acquired; if it is determined that the first state information and the second state information meet a preset second handover condition, second handover information is generated; and a preset node is instructed to send, to the UE, a second handover command that is generated according to the second handover information, so that the UE accesses the WLAN AP indicated by the second handover command, receives an Internet Protocol IP address of the UE in the WLAN, and implements a handover from the cellular network to the WLAN. A handover occasion can be determined according to state information of the cellular network and the WLAN, and therefore effects of improving accuracy of a network handover and reducing complexity of the network handover are achieved by resolving a problem that because states of the cellular network and the WLAN cannot be acquired before the UE decides by itself to initiate a network handover, the UE cannot determine the handover occasion according to the states, which not only reduces accuracy of a network handover, but also increases complexity of the network handover.

Figure 6:
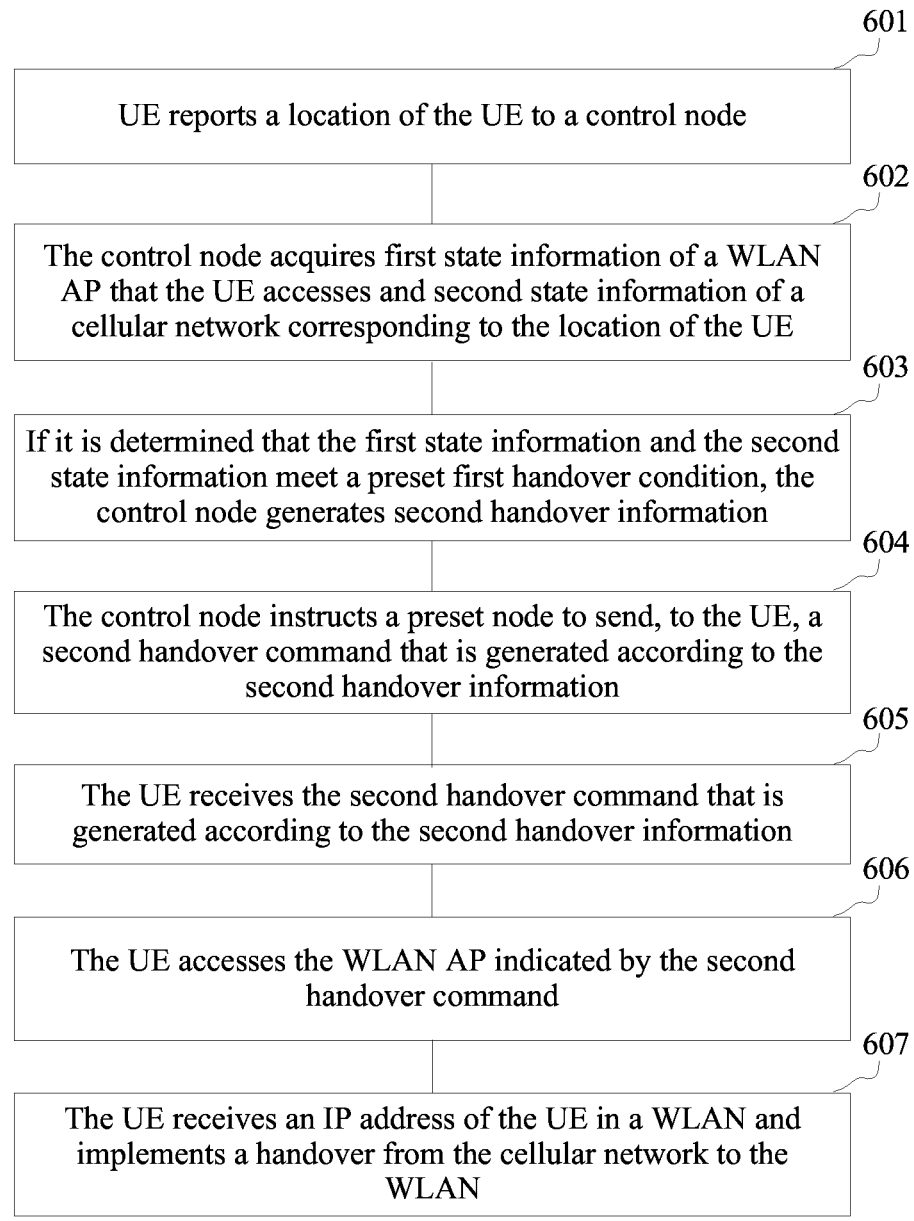
FIG. 6 is a method flowchart of a network handover method according to another embodiment.

Referring to FIG. 6, FIG. 6 is a method flowchart of a network handover method according to another embodiment, and the network handover method is a method for a handover from a cellular network to a WLAN. The network handover method may include the following steps.

Step 601: UE reports a location of the UE to a control node.

In this embodiment, the control node is a node that controls the UE to perform a handover between a WLAN and a cellular network. The control node may be an SRC or the like.

Step 602: The control node acquires first state information of a WLAN AP corresponding to the location of the UE and second state information of a cellular network that the UE accesses.

The control node can acquire state information of both "a cellular network that the UE currently accesses and a WLAN to which the UE is to be handed over, and determine, according to the state information, whether the UE needs to perform a network handover. Therefore, an effect of improving accuracy of a network handover is achieved by resolving a problem that because the UE decides by itself to perform a network handover, states of the cellular network and the WLAN cannot be acquired, and consequently the UE cannot determine a handover occasion according to the states.

The control node may acquire the location of the UE by using control plane signaling, and acquire the first state information and the second state information according to the location of the UE; or the control node may establish a user plane connection to the UE, acquire the location of the UE by using user plane signaling, and acquire the first state information and the second state information according to the location of the UE. The UE establishes the user plane connection to an MCF-C by using many methods, for example, the UE establishes the user plane connection to the MCF-C by sending an IP packet. A method in which the UE establishes the user plane connection to the MCF-C is the same as a method in which UE establishes a user plane connection to a handover node. Reference may be made to a specific description in step 301, and details are not described herein again.

To facilitate verification on the UE and the IP packet, the UE may further carry a UE identity of the UE, for example, an IMSI, in a process of interacting with the MCF-C. If the cellular network is LTE, the SRC cannot acquire the UE identity due to a NAS information encryption mechanism. Therefore, the UE needs to send the UE identity to the SRC. The UE may interact with the MCF-C many times to establish the user plane connection.

Further, when a network handover is performed on the UE, all data flows of the UE may be transferred, that is, handover access is performed on the UE; or some data flows of the UE may be transferred, that is, concurrent access is performed on the UE. Because the concurrent access requires functional support of the UE, when establishing the user plane connection to the MCF-C, the UE may further report whether the UE supports data concurrency, so that the handover access or the concurrent access is subsequently performed on the UE according to the capability.

After establishing the connection to the UE, the control node may acquire the first state information and the second state information. Specifically, the acquiring first state information of a WLAN AP corresponding to the location of the UE and second state information of a cellular network that the UE accesses may include: acquiring the location of the UE; searching for an AC/a BNG of a WLAN AP that is corresponding to a coverage area to which the location belongs or corresponding to a coverage area adjacent to a coverage area to which the location belongs, and acquiring the first state information of the WLAN AP from the AC/BNG; and acquiring the second state information of the cellular network that the UE accesses.

The location of the UE may be identified by using a CGI, an LAI, an RAI, and the like. After acquiring the location of the UE, the control node may search for the AC/BNG of the WLAN AP corresponding to the coverage area to which the location of the UE belongs, or the AC/BNG of the WLAN AP corresponding to a coverage area adjacent to the coverage area to which the location of the UE belongs, and acquire the first state information of the WLAN AP from the found AC/BNG. There is at least one WLAN AP, and the first state information may include at least one of an SSID, a BSSID, an HESSID, air interface and AP load, a frequency channel number, transmit power, transmission load, and WLAN network capability information acquired from a TGW, an AAA, and the like.

When the UE identity and the location change, the control node may re-acquire the UE identity and the location. The control node may search, according to the acquired location of the UE, again for an AC/a BNG, a TGW connecting to the AC/BNG, and the like of the WLAN AP corresponding to the coverage area to which the location belongs or corresponding to the coverage area adjacent to the coverage area to which the location belongs, and re-acquire the first state information. Likewise, the UE may re-acquire the second state information of the cellular network. In addition, a sequence in which the control node acquires the first state information and the second state information is not limited in this embodiment.

Step 603: If it is determined that the first state information and the second state information meet a preset second handover condition, the control node generates second handover information.

For details about a process in which the control node determines whether the first state information and the second state information meet the second handover condition, reference may be made to a description in step 502, and details are not described herein again.

The second handover information may include an access instruction, the UE identity, and an identifier of the WLAN AP. The access instruction may be a handover instruction or a concurrent access instruction access instruction and is used to instruct the MCF-C to perform a handover. The UE identity may be an IMSI and is used to indicate UE on which a handover is performed. The identifier of the WLAN AP is an identifier of a WLAN AP to be accessed by the UE, may be at least one of an SSID, a BSSID, and an HESSID, and is used to indicate a WLAN AP to be accessed by the UE.

Specifically, that the control node generates second handover information may include: acquiring the UE identity and the identifier of the WLAN AP; and adding the UE identity and the identifier of the WLAN AP into the second handover information, where the UE identity is used to generate notification information, and the identifier of the WLAN AP is used to generate a second handover command.

The notification information is used to trigger the TGW to perform a network handover on the UE and may include the UE identity; the second handover command is used to trigger the UE to perform a network handover and may include the identifier of the WLAN AP. Correspondingly, the method may further include: reporting, by the UE, the UE identity to the control node.

Preferably, the control node may further acquire a PDN identity of a PDN connection that is activated in the cellular network by the UE, so that after acquiring the PDN identity from the control node, a PGW allocates an IP address of the UE in the WLAN to the UE according to the PDN identity, and the IP address of the UE in the WLAN is the same as an IP address of the UE in the cellular network. Because the IP address of the UE does not change after the network handover, an upper-layer application may be shielded from a change of an underlying access technology caused by the handover, thereby implementing a seamless handover. The PDN identity is used to indicate a PDN connection to be reserved for the UE. Specifically, the generating second handover information may include: acquiring the UE identity, the identifier of the WLAN AP, and the PDN identity; and adding the UE identity, the identifier of the WLAN AP, and the PDN identity into the second handover information, where the UE identity and the PDN identity are used to generate notification information, and the identifier of the WLAN AP is used to generate the second handover command.

The PDN identity acquired by the control node may be delivered by an SGSN by using Iu interface signaling, or may be determined according to content of a user plane data packet after the control node parses the user plane data packet of the UE, or may be obtained by the control node by intercepting a PDN connection establishment request of the UE and NAS information returned by the SGSN.

When acquiring a PDN identity, if the UE has established at least two PDN connections, the control node selects one PDN connection from the at least two PDN connections and acquires a PDN identity of the PDN connection. Specifically, the control node may select a specific PDN according to a network policy, or select a PDN connection according to at least one of factors, such as a data amount and a service type of the UE in each PDN connection.

Step 604: The control node instructs a preset node to send, to the UE, a second handover command that is generated according to the second handover information.

After determining to perform a network handover on the UE, the control node may send the second handover information to the preset node; after receiving the second handover information, the preset node generates the second handover command according to the second handover information and sends the second handover command to the UE. The preset node may be an MCF-C.

Specifically, the MCF-C may add, into the second handover command, the identifier of the WLAN AP that is carried in the second handover information and send the second handover command to the UE, so as to instruct the UE to perform a network handover. Preferably, if the second handover information carries the PDN identity, the MCF-C may further add the PDN identity into the second handover command. If the second handover information carries the access instruction, the MCF-C may further add the access instruction into the second handover command, so that the UE performs a handover or concurrent access according to the access instruction.

It should be additionally noted that if the IP address of the UE in the cellular network does not need to be reserved, the TGW does not need to establish a cellular network handover preparation context. If the IP address of the UE in the cellular network needs to be reserved, the control node needs to instruct the TGW to generate a WLAN handover preparation context and a handover instruction, so as to reserve the IP address of the UE in the cellular network according to the handover instruction. Specifically, after the second handover information is generated, the method may further include: adding, into the notification information, the UE identity and the PDN identity that are carried in the second handover information; and sending the notification information to the TGW; or sending the notification information to an MCF-W and forwarding, by the MCF-W, the notification information to the TGW, so that the TGW establishes the WLAN handover preparation context according to the UE identity and the PDN identity, and after finding a WLAN handover preparation context corresponding to a UE identity of UE that performs WLAN AP access authentication, determines a PGW according to the WLAN handover preparation context and subscription information of the UE and sends a handover instruction to the PGW, and the PGW returns, to the TGW according to the handover instruction, the IP address that is of the UE in the WLAN and allocated to the UE, where the IP address of the UE in the WLAN is the same as the IP address of the UE in the cellular network.

In this embodiment, if the second handover information does not carry the PDN identity, the TGW may further establish the WLAN handover preparation context according to the UE identity. Therefore, after the second handover information is generated, the method may further include: adding, into the notification information, the UE identity carried in the second handover information; and sending the notification information to the TGW; or sending the notification information to an MCF-W and forwarding, by the MCF-W, the notification information to the TGW, so that the TGW establishes the WLAN handover preparation context according to the UE identity, and after finding a WLAN handover preparation context corresponding to a UE identity of UE that performs WLAN AP access authentication, determines a PGW according to the WLAN handover preparation context and subscription information of the UE and sends a handover instruction to the PGW, and the PGW returns, to the TGW according to the handover instruction, the IP address that is of the UE in the WLAN and allocated to the UE.

A device that generates the notification information may be the MCF-C, or may be the control node. If the MCF-C generates the notification information, the notification information may be sent to the TGW; or the notification information is sent to the MCF-W, and the MCF-W forwards the notification information to the TGW. If the control node generates the notification information, the notification information may be sent to the TGW; or the notification information is sent to the MCF-W, and the MCF-W forwards the notification information to the TGW.

In this embodiment, the TGW may establish the WLAN handover preparation context immediately after receiving the notification information, where the WLAN handover preparation context is used to perform a network handover on the UE. If the notification information carries the UE identity, the TGW establishes the WLAN handover preparation context according to the UE identity; if the notification information carries the UE identity and the PDN identity, the TGW establishes the WLAN handover preparation context according to the UE identity and the PDN identity.

When the TGW establishes the WLAN handover preparation context according to the UE identity or both the UE identity and the PDN identity, a handover preparation timer is enabled; before expiration of the timer, the WLAN waits to be accessed by the UE, for performing a network handover on the UE. A value of the handover preparation timer may be configured by a network, or may be delivered by a handover node or the control node. After the handover preparation timer expires, the TGW deletes the WLAN handover preparation context of the UE.

Step 605: The UE receives the second handover command that is generated according to the second handover information.

Step 606: The UE accesses the WLAN AP indicated by the second handover command.

After receiving the second handover command, the UE may enable a WLAN function and determine the WLAN AP indicated by the identifier of the WLAN AP that is in the second handover command, so as to access the WLAN AP. If the second handover command indicates at least two WLAN APs, the UE may select one WLAN AP from the at least two WLAN APs and access the WLAN AP.

Specifically, if the identifier of the WLAN AP carries one BSSID, the UE selects a WLAN AP indicated by the BSSID; if the identifier of the WLAN AP carries a BSSID list, the UE may select a WLAN AP that has the best signal quality in the list, or the first WLAN AP whose signal quality reaches a preset threshold in the list; if the identifier of the WLAN AP is an SSID, the UE scans surrounding WLAN APs and selects a WLAN AP that has the best signal quality in the WLAN APs of the SSID; if the identifier of the WLAN AP carries an SSID and an HESSID, the UE selects a WLAN AP that belongs to the SSID, belongs to the HESSID, and has the best signal quality.

It should be additionally noted that if the second handover command carries the handover instruction or a local network configuration instructs to perform a network handover on the UE, the UE may further disable a cellular data function, so as to save system resources.

After selecting the WLAN AP, the UE may initiate establishment of a connection and an association to the selected WLAN AP and perform access authentication. Specifically, an HSS/HLR sends the subscription information of the UE to the AC/BNG and the TGW by using an AAA server. The AC/BNG determines, according to the subscription information, whether to accept WLAN access authentication of the UE. If the AC/BNG determines to accept the WLAN access authentication of the UE, when authentication is performed on the UE, the AAA Server sends the UE identity to the TGW.

In this embodiment, manners of EAP authentication between the UE and the WLAN are used for description, including EAP-SIM, EAP-AKA, EAP-AKA', EAP-PEAP, and the like. Certainly, authentication between the UE and the WLAN may further be performed in another manner, for example, a PSK (Pre-Shared Key, pre-shared key) or a Portal, which is not limited in this embodiment.

It should be additionally noted that when the WLAN access authentication is performed on the UE, the TGW may acquire the UE identity and check whether there is a WLAN handover preparation context corresponding to the UE identity. After finding that there is a WLAN handover preparation context corresponding to the UE identity, the TGW may set a handover instruction according to the WLAN handover preparation context and the subscription information of the UE and send the handover instruction to the PGW, so that the handover instruction instructs the PGW to allocate the IP address of the UE in the cellular network, and the IP address of the UE in the cellular network is the same as the IP address of the UE in the WLAN. After finding that there is no WLAN handover preparation context corresponding to the UE identity or that the WLAN handover preparation context has been deleted or that there is no PDN connection context in the subscription information of the UE, the TGW performs a normal process of establishing a PDN connection for the UE and does not perform a network handover on the UE; in this case, the IP address that is of the UE in the WLAN and allocated by the PGW to the UE is different from the IP address of the UE in the cellular network.

Specifically, the determining a PGW according to the WLAN handover preparation context and subscription information of the UE may include: if the subscription information carries one PGW identifier, determining a PGW indicated by the PGW identifier; or if the subscription information carries at least two PGW identifiers and there is a PGW identifier that matches the PDN identity carried in the WLAN handover preparation context, determining a PGW indicated by the PGW identifier that matches the PDN identity; or if the subscription information carries at least two PGW identifiers and there is no PGW identifier that matches the PDN identity carried in the WLAN handover preparation context, determining a PGW according to a network configuration; or if the subscription information carries at least two PGW identifiers and the WLAN handover preparation context does not carry a PDN identity, determining a PGW according to a network configuration.

If there are at least two APN/PDN connection contexts that are in the subscription information of the UE and record the PGW identifier, the TGW checks whether the WLAN handover preparation context carries a PDN identity. If the WLAN handover preparation context carries the PDN identity, the TGW finds an APN/PDN connection context that matches the PDN identity, and checks whether the APN/PDN connection context carries a PGW identifier; if the APN/PDN connection context carries a PGW identifier, the TGW selects the PGW for the UE and initiates PDN connection establishment. If the WLAN handover preparation context does not carry the PDN identity, the TGW may select a PGW according to a network configuration and initiate PDN connection establishment. The UE may connect to a specific APN/PDN, or connect to an APN/a PDN according to an APN/PDN priority list, or connect to a default APN/PDN.

If there are at least two APN/PDN connection contexts that are in the subscription information of the UE and record the PGW identifier, and the WLAN handover preparation context carries the PDN identity, but the TGW does not find an APN/PDN connection context that matches the PDN identity, or an APN/PDN connection context corresponding to the PDN identity does not carry the PGW identifier, it may be configured by a network whether the TGW performs handover PDN connection establishment for the UE or which PGW is selected to perform PDN connection establishment. If it is determined to establish a PDN connection for the UE, the UE may connect to a specific APN/PDN, or connect to an APN/a PDN according to an APN/PDN priority list, or connect to a default APN/PDN.

After selecting the PGW, the TGW may send the handover instruction to the PGW. Further, to enable the PGW to determine the UE on which a network handover is to be performed, the TGW further needs to add the UE identity and the handover instruction into a create session request (Create Session Request) and send the create session request to an SGW, and the SGW forwards the create session request to the PGW; after allocating an IP address to the UE according to the handover instruction, the PGW adds the IP address into a create session response (Create Session Response) and sends the create session response to the SGW, the SGW forwards the create session response to the TGW, and the TGW sends the IP address to the UE according to the UE identity. The handover instruction needs to be carried in dedicated signaling for sending, which avoids a problem that a network handover cannot be performed when the UE does not support the dedicated signaling, and achieves an effect of expanding an application scope of the network handover method.

Preferably, the TGW may further add the PDN identity into the create session request and send the create session request to the SGW, and the SGW forwards the create session request to the PGW; after allocating an IP address to the UE according to the handover instruction and the PDN identity, the PGW adds the IP address into the create session response and sends the create session response to the SGW, the SGW forwards the create session response to the TGW, and the TGW sends the IP address to the UE according to the UE identity. Because the IP address of the UE in the cellular network is the same as the IP address of the UE in the WLAN, an upper-layer application is shielded from a change of an underlying access technology caused by the handover, thereby implementing a seamless handover.

Further, the TGW may perform a network handover on the UE after the UE passes authentication, or may perform a network handover on the UE after receiving preset information, where the preset information may be a DHCP (Dynamic Host Configuration Protocol, Dynamic Host Configuration Protocol) request. Specifically, the UE sends the DHCP request to the TGW; the TGW receives the DHCP request sent by the UE, and triggers a network handover on the UE according to the DHCP request. Further, if receiving the DHCP request sent by the UE, the TGW may add the IP address into a DHCP response and send the DHCP response to the UE.

Step 607: The UE receives an IP address of the UE in a WLAN and completes a handover from the cellular network to the WLAN.

After completing a handover from the cellular network to the WLAN, the UE can send an uplink data packet and receive a downlink data packet by using the WLAN, so as to access a service of the PDN. Specifically, for details about a process in which the UE accesses a PDN service, reference may be made to a description in step 307, and details are not described herein again.

Figure 7:
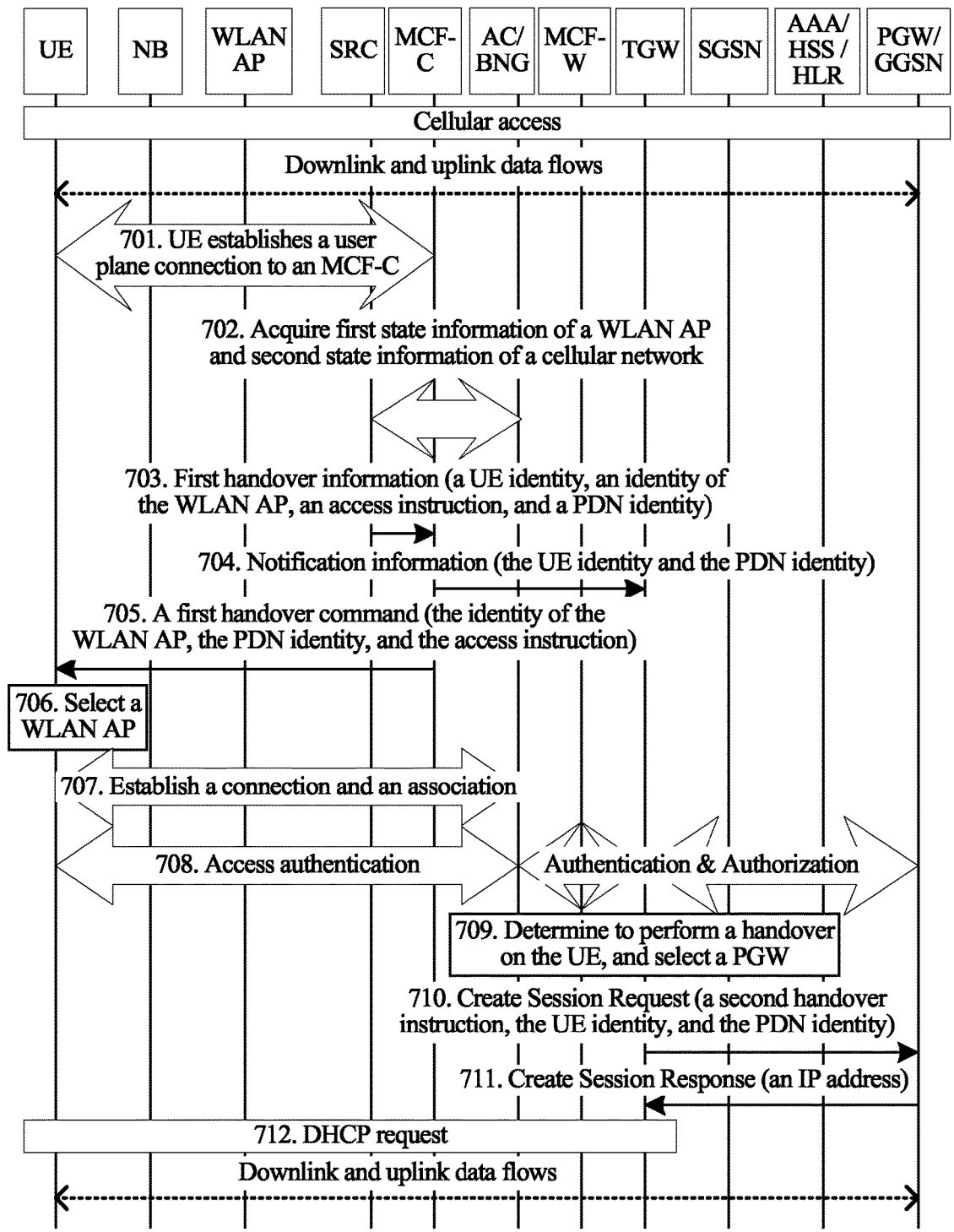
FIG. 7 is a flowchart of application of a handover from a cellular network to a WLAN according to an embodiment.

Referring to FIG. 7, this embodiment further provides a flowchart of application of the foregoing handover from a cellular network to a WLAN. An example in which a control node is an SRC and the handover is performed by using user plane signaling is used for description, and then a process of the network handover is specifically as follows.

Step 701: UE establishes a user plane connection to an MCF-C.

Step 702: The SRC acquires first state information of a WLAN AP and second state information of a cellular network that the UE accesses.

Step 703: The SRC sends second handover information to the MCF-C, where the second handover information may include a UE identity, an identifier of the WLAN AP, an access instruction, and a PDN identity.

Step 704: The MCF-C sends notification information to a TGW, where the notification information may include the UE identity and the PDN identity.

The notification information may also be generated and sent to the TGW by the SRC. When the MCF-C or the SRC sends the notification information to the TGW, the notification information may be sent directly to the TGW, or may be forwarded to the TGW by using an MCF-W.

Step 705: The MCF-C sends a second handover command to the UE, where the second handover command may include the identifier of the WLAN AP, the PDN identity, and the access instruction.

Step 706: The UE selects, according to the identifier of the WLAN AP that is carried in the second handover command, a WLAN AP to access.

Step 707: The UE initiates establishment of a connection and an association to the selected WLAN AP.

Step 708: The UE performs WLAN access authentication.

Step 709: The TGW determines, according to a WLAN handover preparation context and subscription information of the UE, to perform a network handover on the UE, and selects a PGW.

Step 710: The TGW sends a Create Session Request to the selected PGW, where the Create Session Request includes a handover instruction, the UE identity, and the PDN identity.

Step 711: The PGW returns a Create Session Response to the TGW, where the Create Session Response includes an IP address that is of the UE in a WLAN and allocated to the UE.

Step 712: The UE acquires the IP address of the UE in the WLAN by sending a DHCP request to the TGW.

In conclusion, according to the network handover method provided in this embodiment, first state information of a wireless local area network access point WLAN AP corresponding to a location of user equipment UE and second state information of a cellular network that the UE accesses are acquired; if it is determined that the first state information and the second state information meet a preset second handover condition, second handover information is generated; and a preset node is instructed to send, to the UE, a second handover command that is generated according to the second handover information, so that the UE accesses the WLAN AP indicated by the second handover command, receives an Internet Protocol IP address of the UE in the WLAN, and implements a handover from the cellular network to the WLAN. A handover occasion can be determined according to state information of the cellular network and the WLAN, and therefore effects of improving accuracy of a network handover and reducing complexity of the network handover are achieved by resolving a problem that because states of the cellular network and the WLAN cannot be acquired before the UE decides by itself to initiate a network handover, the UE cannot determine the handover occasion according to the states, which not only reduces accuracy of a network handover, but also increases complexity of the network handover. In addition, a PDN identity is sent to a PGW, so that the PGW can allocate an IP address to the UE according to the PDN identity, and the IP address of the UE does not change after a handover, which resolves a problem that a service is interrupted due to a change of the IP address of the UE after the handover, and achieves an effect of optimizing the network handover.

Figure 8:
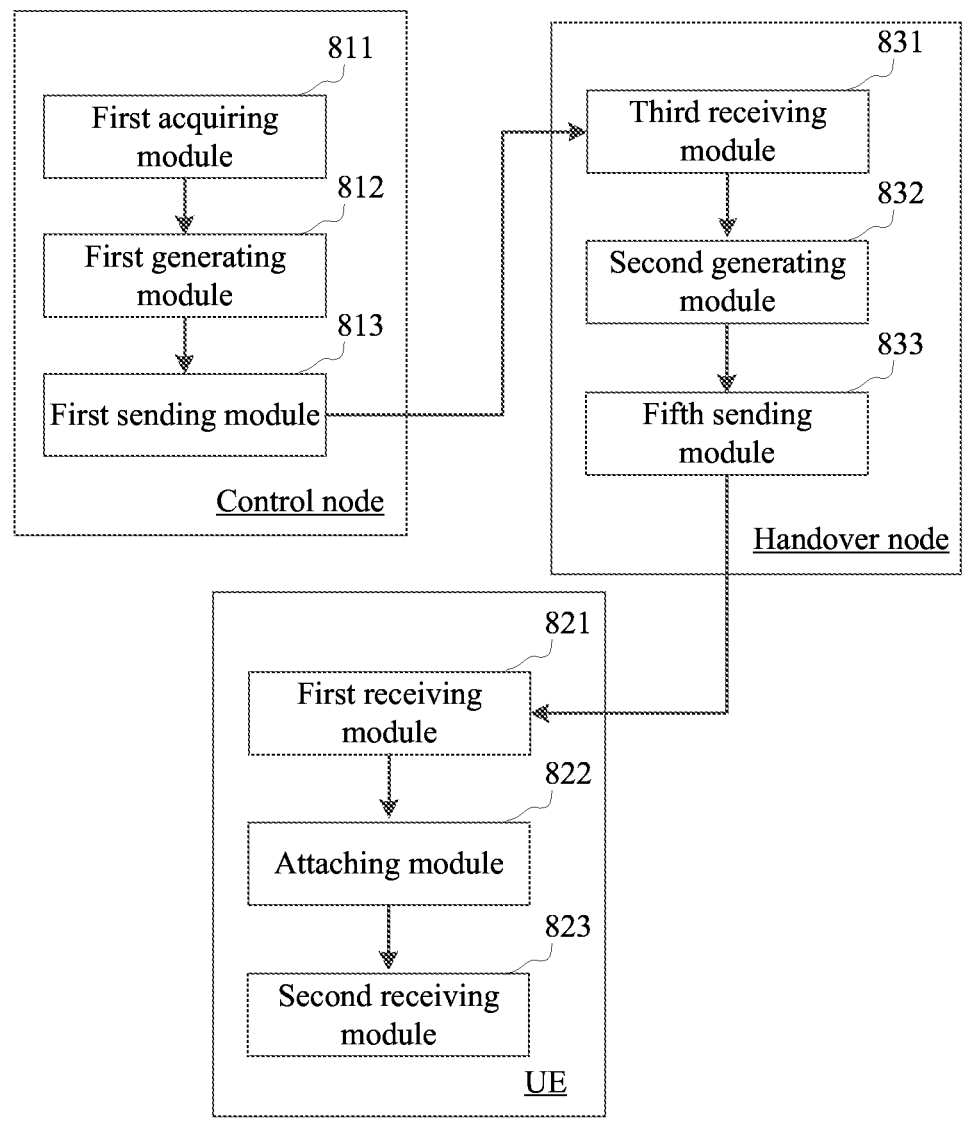
FIG. 8 is a structural block diagram of a network handover system according to an embodiment.

Referring to FIG. 8, FIG. 8 is a structural block diagram of a network handover system according to an embodiment. The network handover system is used for a handover from a WLAN to a cellular network and may include: a control node, user equipment UE, and a handover node. A control apparatus included in the control node may include: a first acquiring module 811, a first generating module 812, and a first sending module 813; a user apparatus included in the UE may include: a first receiving module 821, an attaching module 822, and a second receiving module 823; a handover apparatus included in the handover node may include: a third receiving module 831, a second generating module 832, and a fifth sending module 833. The network handover system may include: the first acquiring module 811, configured to acquire first state information of a WLAN AP that the UE accesses and second state information of a cellular network corresponding to a location of the UE; the first generating module 812, configured to: if it is determined that the first state information and the second state information that are acquired by the first acquiring module 811 meet a preset first handover condition, generate first handover information; the first sending module 813, configured to send the first handover information to the handover node, so that the handover node sends, to the UE, a first handover command that is generated according to the first handover information generated by the first generating module 812, and the UE attaches to the cellular network indicated by the first handover command, receives an IP address of the UE in the cellular network, and implements a handover from a WLAN to the cellular network; the third receiving module 831, configured to receive the first handover information sent by the control node, where the first handover information is generated when the control node acquires the first state information of the WLAN AP that the UE accesses and the second state information of the cellular network corresponding to the location of the UE and it is determined that the first state information and the second state information meet the preset first handover condition; the second generating module 832, configured to generate the first handover command according to the first handover information received by the third receiving module 831; the fifth sending module 833, configured to send the first handover command generated by the second generating module to the UE, so that the UE receives the first handover command that is generated according to the first handover information by the handover node, attaches to the cellular network indicated by the first handover command, receives the Internet Protocol IP address of the UE in the cellular network, and implements a handover from the WLAN to the cellular network; the first receiving module 821, configured to receive the first handover command that is generated according to the first handover information by the handover node, where the first handover information is generated when the control node acquires the first state information of the WLAN AP that the UE accesses and the second state information of the cellular network corresponding to the location of the UE and it is determined that the first state information and the second state information meet the preset first handover condition; the attaching module 822, configured to attach to the cellular network indicated by the first handover command received by the first receiving module 821; and the second receiving module 823, configured to: after the attaching module 822 attaches to the cellular network indicated by the first handover command, receive the IP address of the UE in the cellular network, and implement a handover from the WLAN to the cellular network.

In conclusion, according to the network handover system provided in this embodiment, first state information of a wireless local area network access point WLAN AP that user equipment UE accesses and second state information of a cellular network corresponding to a location of the UE are acquired; if it is determined that the first state information and the second state information meet a preset first handover condition, first handover information is generated; and the first handover information is sent to a handover node, so that the handover node sends, to the UE, a first handover command that is generated according to the first handover information, and the UE attaches to the cellular network indicated by the first handover command, receives an Internet Protocol IP address of the UE in the cellular network, and implements a handover from the WLAN to the cellular network. A handover occasion can be determined according to state information of the cellular network and the WLAN, and therefore effects of improving accuracy of a network handover and reducing complexity of the network handover are achieved by resolving a problem that because states of the cellular network and the WLAN cannot be acquired before the UE decides by itself to initiate a network handover, the UE cannot determine the handover occasion according to the states, which not only reduces accuracy of a network handover, but also increases complexity of the network handover.

Figure 9:
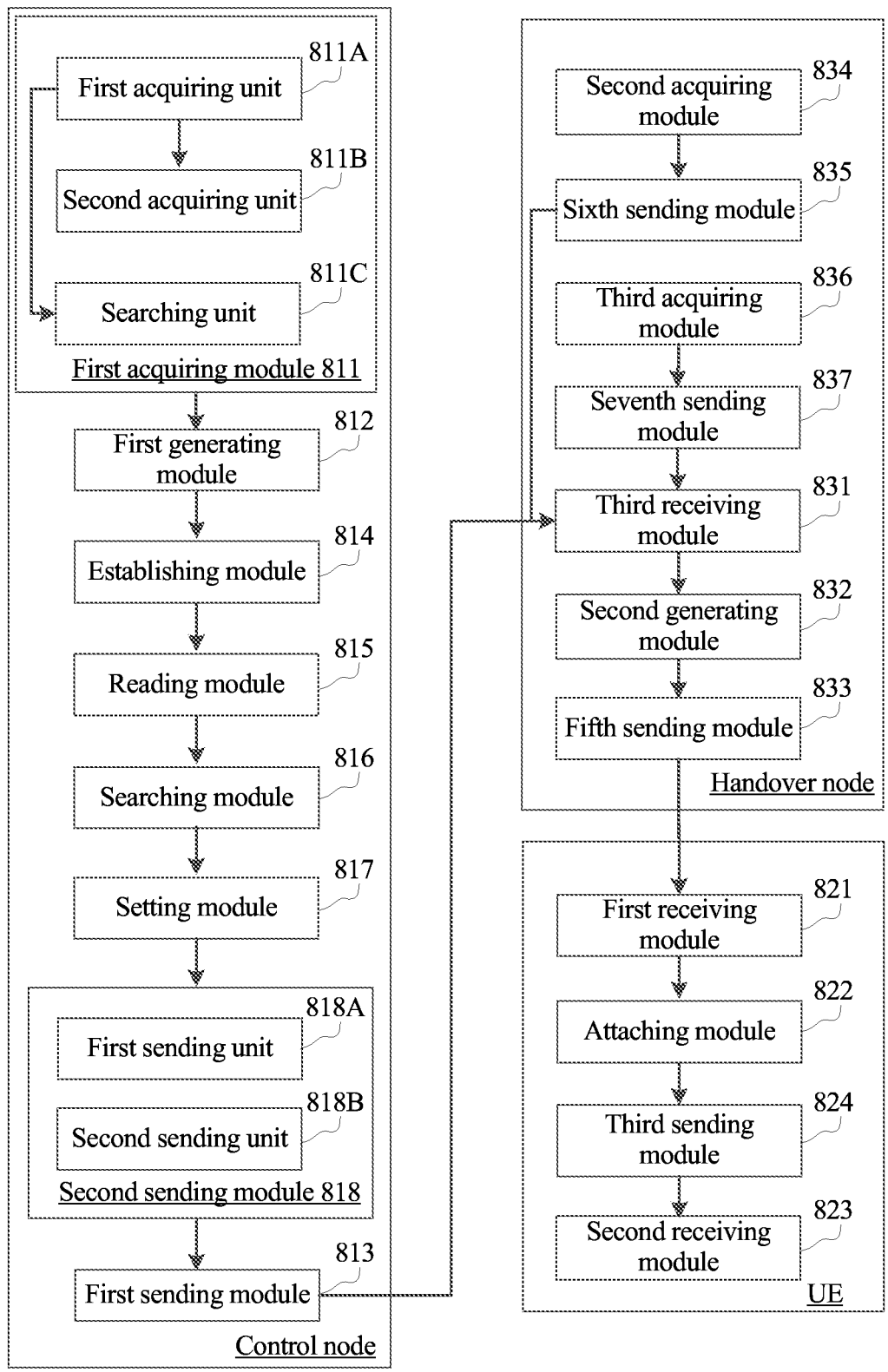
FIG. 9 is a structural block diagram of a network handover system according to another embodiment.

Referring to FIG. 9, FIG. 9 is a structural block diagram of a network handover system according to another embodiment. The network handover system is used for a handover from a WLAN to a cellular network and may include: a control node, user equipment UE, and a handover node. A control apparatus included in the control node may include: a first acquiring module 811, a first generating module 812, and an first sending module 813; a user apparatus included in the UE may include: a first receiving module 821, an attaching module 822, and a second receiving module 823; a handover apparatus included in the handover node may include: a third receiving module 831, a second generating module 832, and a fifth sending module 833. The network handover system may include: the first acquiring module 811, configured to acquire first state information of a WLAN AP that the UE accesses and second state information of a cellular network corresponding to a location of the UE; the first generating module 812, configured to: if it is determined that the first state information and the second state information that are acquired by the first acquiring module 811 meet a preset first handover condition, generate first handover information; the first sending module 813, configured to send the first handover information to the handover node, so that the handover node sends, to the UE, a first handover command that is generated according to the first handover information generated by the first generating module 812, and the UE attaches to the cellular network indicated by the first handover command, receives an IP address of the UE in the cellular network, and implements a handover from a WLAN to the cellular network; the third receiving module 831, configured to receive the first handover information sent by the control node, where the first handover information is generated when the control node acquires the first state information of the WLAN AP that the UE accesses and the second state information of the cellular network corresponding to the location of the UE and it is determined that the first state information and the second state information meet the preset first handover condition; the second generating module 832, configured to generate the first handover command according to the first handover information received by the third receiving module 831; the fifth sending module 833, configured to send the first handover command generated by the second generating module to the UE, so that the UE receives the first handover command that is generated according to the first handover information by the handover node, attaches to the cellular network indicated by the first handover command, receives the Internet Protocol IP address of the UE in the cellular network, and implements a handover from the WLAN to the cellular network; the first receiving module 821, configured to receive the first handover command that is generated according to the first handover information by the handover node, where the first handover information is generated when the control node acquires the first state information of the WLAN AP that the UE accesses and the second state information of the cellular network corresponding to the location of the UE and it is determined that the first state information and the second state information meet the preset first handover condition; the attaching module 822, configured to attach to the cellular network indicated by the first handover command received by the first receiving module 821; and the second receiving module 823, configured to: after the attaching module 822 attaches to the cellular network indicated by the first handover command, receive the IP address of the UE in the cellular network, and implement a handover from the WLAN to the cellular network.

Further, the handover apparatus may further include: a second acquiring module 834, configured to: before the third receiving module 831 receives the first handover information sent by the control node, acquire the location of the UE by using user plane signaling; or acquire the location of the UE by using IPsec, IKE, EAP, or dedicated control signaling; and a sixth sending module 835, configured to send the location acquired by the second acquiring module 834 to the control node, so that after acquiring the location, the control node acquires the first state information of the WLAN AP that the UE accesses and the second state information of the cellular network corresponding to the location.

Correspondingly, the first acquiring module 811 may include: a first acquiring unit 811A, configured to acquire the location of the UE; a second acquiring unit 811B, configured to: determine, according to the location acquired by the first acquiring unit 811A, an AC/a BNG of a WLAN that the UE accesses, and acquire the first state information of the WLAN AP from the AC/BNG; and a searching unit 811C, configured to search for the second state information of the cellular network corresponding to the location of the UE that is acquired by the first acquiring unit 811A, where the cellular network corresponding to the location of the UE is: a cellular network to which the UE connects, or a cellular network that the UE camps on, or a cellular network corresponding to a coverage area to which the location belongs, or a cellular network corresponding to a coverage area adjacent to a coverage area to which the location belongs.

Further, the handover apparatus may further include: a third acquiring module 836, configured to: before the third receiving module 831 receives the first handover information sent by the control node, acquire, by using the user plane signaling, a UE identity and acquire a packet data network PDN identity; or acquire, by using the IPsec, the IKE, the EAP, or the dedicated control signaling, a UE identity and acquire a PDN identity; and a seventh sending module 837, configured to send the UE identity and the PDN identity that are acquired by the third acquiring module 836 to the control node, so that the control node establishes a cellular network handover preparation context according to the UE identity and the PDN identity.

Correspondingly, the control apparatus further includes: an establishing module 814, configured to: after the first generating module 812 determines that the first state information and the second state information meet the preset first handover condition, acquire a UE identity and a packet data network PDN identity and establish a cellular network handover preparation context according to the UE identity and the PDN identity.

Correspondingly, the control apparatus further includes: a reading module 815, configured to: after the establishing module 814 establishes the cellular network handover preparation context according to the UE identity and the PDN identity, read a UE identity of the UE that currently attaches to the cellular network; a searching module 816, configured to search for a cellular network handover preparation context corresponding to the UE identity read by the reading module 815; a setting module 817, configured to: if the searching module 816 finds the cellular network handover preparation context corresponding to the UE identity, set a first handover instruction; and a second sending module 818, configured to send the first handover instruction set by the setting module 817 and the PDN identity to a mobility management device, so that the mobility management device instructs a PGW to allocate the IP address of the UE in the cellular network to the UE, and the UE implements a handover from the WLAN to the cellular network, where the IP address of the UE in the cellular network is the same as an IP address of the UE in the WLAN.

Further, if the cellular network is a UMTS or a GSM and the first handover command includes the PDN identity, the user apparatus further includes: a third sending module 824, configured to: before the second receiving module 823 receives the IP address of the UE in the cellular network, send the PDN identity or both the PDN identity and a preset parameter that carries a UE identity to the control node, so that after finding a cellular network handover preparation context corresponding to the acquired UE identity, the control node sets a first handover instruction and sends the first handover instruction to a mobility management device, so that the mobility management device instructs a PGW to allocate the IP address of the UE in the cellular network to the UE, where the preset parameter is an APN or a PCO, and the IP address of the UE in the cellular network is the same as an IP address of the UE in the WLAN.

Further, the user apparatus further includes: a fourth sending module, configured to: add a UE identity into RRC information and send the RRC information to the control node; or receive an identity request sent by the control node and feed back a UE identity to the control node according to the identity request.

Correspondingly, the reading module 815 is configured to: acquire the UE identity in an attach request sent by the UE; or send an identity request to the UE and receive a UE identity that is fed back according to the identity request by the UE; or acquire the UE identity carried in a preset parameter, where the preset parameter is an access point name APN or a protocol configuration option PCO; or acquire the UE identity in radio resource control RRC information sent by the UE.

Specifically, the second sending module 818 includes: a first sending unit 818A, configured to: if the cellular network is a UMTS or a GSM, send, by the control node, the first handover instruction and the PDN identity that is carried in the cellular network handover preparation context to an SGSN, or instruct, by the control node, a first node to send the first handover instruction and the PDN identity that is carried in the cellular network handover preparation context to the SGSN, so that the SGSN determines the PGW according to the first handover instruction, the PDN identity, and subscription information of the UE and sends a second handover instruction and the PDN identity to the PGW, and the PGW returns, to the SGSN according to the second handover instruction and the PDN identity, the IP address that is of the UE in the cellular network and allocated to the UE; or a second sending unit 818B, configured to: if the cellular network is LTE, send, by the control node, the first handover instruction and the PDN identity that is carried in the cellular network handover preparation context to an MME, or instruct, by the control node, a second node to send the first handover instruction and the PDN identity that is carried in the cellular network handover preparation context to the MME, so that the MME determines the PGW according to the first handover instruction, the PDN identity, and subscription information of the UE and sends a second handover instruction and the PDN identity to the PGW, and the PGW returns, to the MME according to the second handover instruction and the PDN identity, the IP address that is of the UE in the cellular network and allocated to the UE; where the IP address of the UE in the cellular network is the same as the IP address of the UE in the WLAN.

Further, the fifth sending module 833 is configured to: send, by using the user plane signaling, the first handover command to the UE; or send, by using the IPsec, the IKE, the EAP, or the dedicated control signaling, the first handover command to the UE.

Correspondingly, the first receiving module 821 is configured to: receive the first handover command by using the user plane signaling; or receive the first handover command by using the IPsec, the IKE, the EAP, or the dedicated control signaling.

In conclusion, according to the network handover system provided in this embodiment, first state information of a wireless local area network access point WLAN AP that user equipment UE accesses and second state information of a cellular network corresponding to a location of the UE are acquired; if it is determined that the first state information and the second state information meet a preset first handover condition, first handover information is generated; and the first handover information is sent to a handover node, so that the handover node sends, to the UE, a first handover command that is generated according to the first handover information, and the UE attaches to the cellular network indicated by the first handover command, receives an Internet Protocol IP address of the UE in the cellular network, and implements a handover from the WLAN to the cellular network. A handover occasion can be determined according to state information of the cellular network and the WLAN, and therefore effects of improving accuracy of a network handover and reducing complexity of the network handover are achieved by resolving a problem that because states of the cellular network and the WLAN cannot be acquired before the UE decides by itself to initiate a network handover, the UE cannot determine the handover occasion according to the states, which not only reduces accuracy of a network handover, but also increases complexity of the network handover. In addition, a PDN identity is sent to a PGW, so that the PGW can allocate an IP address to the UE according to the PDN identity, and the IP address of the UE does not change after a handover, which resolves a problem that a service is interrupted due to a change of the IP address of the UE after the handover, and achieves an effect of optimizing the network handover.

Figure 10:
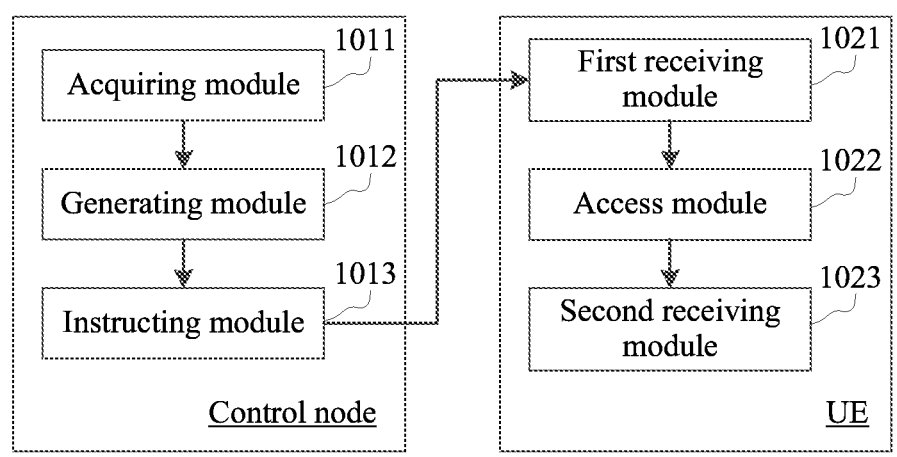
FIG. 10 is a structural block diagram of a network handover system according to still another embodiment.

Referring to FIG. 10, FIG. 10 is a structural block diagram of a network handover system according to still another embodiment. The network handover system is used for a handover from a cellular network to a WLAN and may include: a control node and user equipment UE. A control apparatus included in the control node may include: an acquiring module 1011, a generating module 1012, and an instructing module 1013; a user apparatus included in the UE may include: a first receiving module 1021, an access module 1022, and a second receiving module 1023. The network handover system may include: the acquiring module 1011, configured to acquire first state information of a WLAN AP corresponding to a location of the UE and second state information of a cellular network that the UE accesses; the generating module 1012, configured to: if it is determined that the first state information and the second state information that are acquired by the acquiring module 1011 meet a preset second handover condition, generate second handover information; the instructing module 1013, configured to instruct a preset node to send, to the UE, a second handover command that is generated according to the second handover information generated by the generating module 1012, so that the UE accesses the WLAN AP indicated by the second handover command, receives an IP address of the UE in a WLAN, and implements a handover from the cellular network to the WLAN; the first receiving module 1021, configured to receive the second handover command that is generated according to the second handover information, where the second handover information is generated when the control node acquires the first state information of the WLAN AP corresponding to the location of the UE and the second state information of the cellular that the UE accesses and it is determined that the first state information and the second state information meet the preset second handover condition; the access module 1022, configured to access the WLAN AP indicated by the second handover command received by the first receiving module 1021; and the second receiving module 1023, configured to: after the access module 1022 accesses the WLAN AP indicated by the second handover command, receive the IP address of the UE in the WLAN, and implement a handover from the cellular network to the WLAN.

In conclusion, according to the network handover system provided in this embodiment, first state information of a wireless local area network access point WLAN AP corresponding to a location of user equipment UE and second state information of a cellular network that the UE accesses are acquired; if it is determined that the first state information and the second state information meet a preset second handover condition, second handover information is generated; and a preset node is instructed to send, to the UE, a second handover command that is generated according to the second handover information, so that the UE accesses the WLAN AP indicated by the second handover command, receives an Internet Protocol IP address of the UE in the WLAN, and implements a handover from the cellular network to the WLAN. A handover occasion can be determined according to state information of the cellular network and the WLAN, and therefore effects of improving accuracy of a network handover and reducing complexity of the network handover are achieved by resolving a problem that because states of the cellular network and the WLAN cannot be acquired before the UE decides by itself to initiate a network handover, the UE cannot determine the handover occasion according to the states, which not only reduces accuracy of a network handover, but also increases complexity of the network handover.

Figure 11:
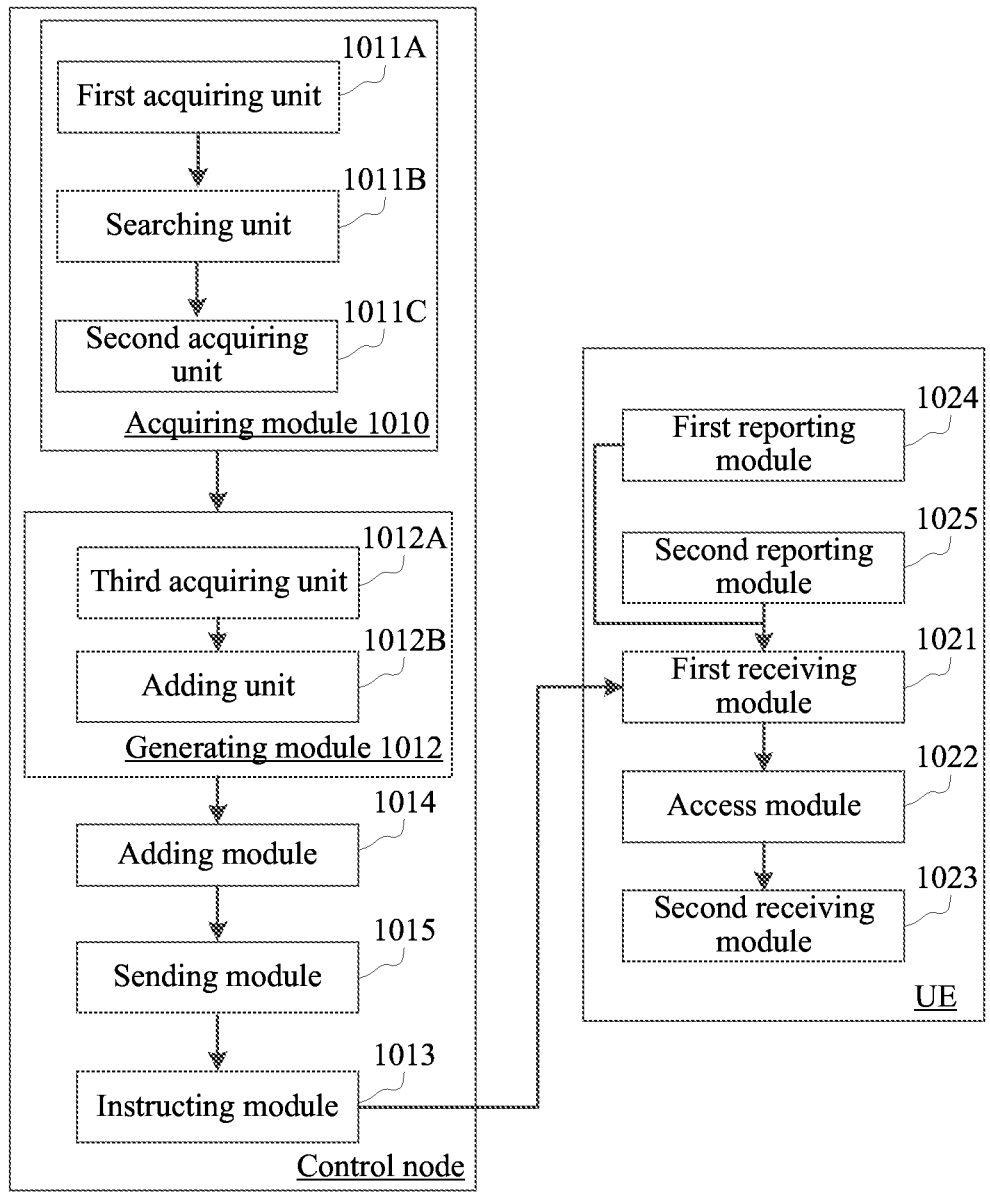
FIG. 11 is a structural block diagram of a network handover system according to yet another embodiment.

Referring to FIG. 11, FIG. 11 is a structural block diagram of a network handover system according to yet another embodiment. The network handover system is used for a handover from a cellular network to a WLAN and may include: a control node and user equipment UE. A control apparatus included in the control node may include: an acquiring module 1011, a generating module 1012, and an instructing module 1013; a user apparatus included in the UE may include: a first receiving module 1021, an access module 1022, and a second receiving module 1023. The network handover system may include: the acquiring module 1011, configured to acquire first state information of a WLAN AP corresponding to a location of the UE and second state information of a cellular network that the UE accesses; the generating module 1012, configured to: if it is determined that the first state information and the second state information that are acquired by the acquiring module 1011 meet a preset second handover condition, generate second handover information; the instructing module 1013, configured to instruct a preset node to send, to the UE, a second handover command that is generated according to the second handover information generated by the generating module 1012, so that the UE accesses the WLAN AP indicated by the second handover command, receives an IP address of the UE in a WLAN, and implements a handover from the cellular network to the WLAN; the first receiving module 1021, configured to receive the second handover command that is generated according to the second handover information, where the second handover information is generated when the control node acquires the first state information of the WLAN AP corresponding to the location of the UE and the second state information of the cellular that the UE accesses and it is determined that the first state information and the second state information meet the preset second handover condition; the access module 1022, configured to access the WLAN AP indicated by the second handover command received by the first receiving module 1021; and the second receiving module 1023, configured to: after the access module 1022 accesses the WLAN AP indicated by the second handover command, receive the IP address of the UE in the WLAN, and implement a handover from the cellular network to the WLAN.

Further, the user apparatus further includes: a first reporting module 1024, configured to: before the first receiving module 1021 receives the second handover command that is generated according to the second handover information, report the location of the UE to the control node, so that after acquiring the location, the control node acquires the first state information of the WLAN AP corresponding to the location and the second state information of the cellular network that the UE accesses.

Correspondingly, the acquiring module 1011 includes: a first acquiring unit 1011A, configured to acquire the location of the UE; a searching unit 1011B, configured to: search for an access controller AC/a broadband network gateway BNG of a WLAN AP that is acquired by the first acquiring unit 1011A and is corresponding to a coverage area to which the location belongs or corresponding to a coverage area adjacent to a coverage area to which the location belongs, and acquire the first state information of the WLAN AP from the AC/BNG; and a second acquiring unit 1011C, configured to acquire the second state information of the cellular network that the UE accesses.

Further, the user apparatus further includes: a second reporting module 1025, configured to: before the first receiving module 1021 receives the second handover command that is generated according to the second handover information, report a UE identity to the control node, where the UE identity is added into notification information and sent to a TGW by the control node, so that the TGW establishes a WLAN handover preparation context according to the UE identity and a packet data network PDN identity that is added by the control node into the notification information, and after finding a WLAN handover preparation context corresponding to a UE identity of UE that performs WLAN AP access authentication, determines a PGW according to the WLAN handover preparation context and subscription information of the UE and sends a handover instruction to the PGW, and the PGW returns, to the TGW according to the handover instruction, the IP address that is of the UE in the WLAN and allocated to the UE, where the IP address of the UE in the WLAN is the same as an IP address of the UE in the cellular network.

Correspondingly, the generating module 1012 includes: a third acquiring unit 1012A, configured to acquire a UE identity, an identifier of the WLAN AP, and a PDN identifier; and an adding unit 1012B, configured to add the UE identity, the identifier of the WLAN AP, and the PDN identity that are acquired by the third acquiring unit 1012A into the second handover information, so that when generating notification information, an MCF-C adds, into the notification information, the UE identity and the PDN identity that are carried in the second handover information, and adds, into the second handover command, the identifier of the WLAN AP that is carried in the second handover information.

Further, the control apparatus further includes: an adding module 1014, configured to: after the generating module 1012 generates the second handover information, add, into the notification information, the UE identity and the PDN identity that are carried in the second handover information; and a sending module 1015, configured to: send the notification information generated by the adding module 1014 to the TGW; or send the notification information generated by the adding module 1014 to an MCF-W, and the MCF-W forwards the notification information to the TGW, so that the TGW establishes a WLAN handover preparation context according to the UE identity and the PDN identity, and after finding a WLAN handover preparation context corresponding to a UE identity of UE that performs WLAN AP access authentication, determines a PGW according to the WLAN handover preparation context and subscription information of the UE and sends a handover instruction to the PGW, and the PGW returns, to the TGW according to the handover instruction, the IP address that is of the UE in the WLAN and allocated to the UE, where the IP address of the UE in the WLAN is the same as an IP address of the UE in the cellular network.

In conclusion, according to the network handover system provided in this embodiment, first state information of a wireless local area network access point WLAN AP corresponding to a location of user equipment UE and second state information of a cellular network that the UE accesses are acquired; if it is determined that the first state information and the second state information meet a preset second handover condition, second handover information is generated; and a preset node is instructed to send, to the UE, a second handover command that is generated according to the second handover information, so that the UE accesses the WLAN AP indicated by the second handover command, receives an Internet Protocol IP address of the UE in the WLAN, and implements a handover from the cellular network to the WLAN. A handover occasion can be determined according to state information of the cellular network and the WLAN, and therefore effects of improving accuracy of a network handover and reducing complexity of the network handover are achieved by resolving a problem that because states of the cellular network and the WLAN cannot be acquired before the UE decides by itself to initiate a network handover, the UE cannot determine the handover occasion according to the states, which not only reduces accuracy of a network handover, but also increases complexity of the network handover. In addition, a PDN identity is sent to a PGW, so that the PGW can allocate an IP address to the UE according to the PDN identity, and the IP address of the UE does not change after a handover, which resolves a problem that a service is interrupted due to a change of the IP address of the UE after the handover, and achieves an effect of optimizing the network handover.

Figure 12:
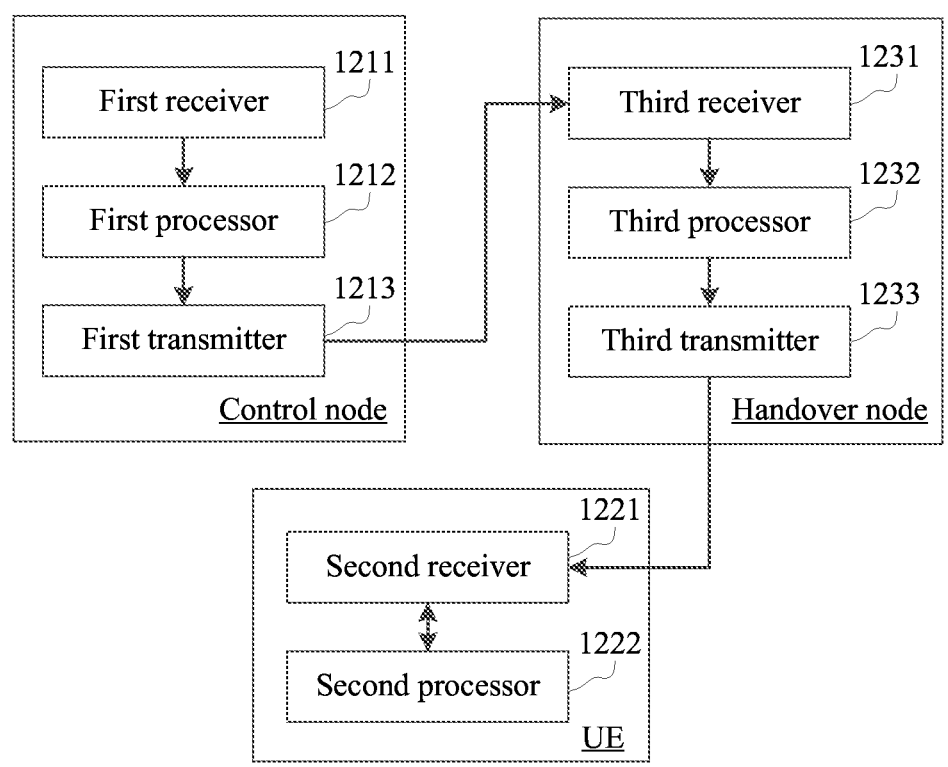
FIG. 12 is a structural block diagram of a network handover system according to yet another embodiment.

Referring to FIG. 12, FIG. 12 is a structural block diagram of a network handover system according to yet another embodiment. The network handover system is used for a handover from a WLAN to a cellular network and may include: a control node, user equipment UE, and a handover node. A control apparatus included in the control node may include: a first receiver 1211, a first processor 1212, and a first transmitter 1213; a user apparatus included in the UE may include: a second receiver 1221 and a second processor 1222; a handover apparatus included in the handover node may include: a third receiver 1231, a third processor 1232, and a transmitter 1233. The network handover system may include: the first receiver 1211, configured to acquire first state information of a WLAN AP that the UE accesses and second state information of a cellular network corresponding to a location of the UE; the first processor 1212, configured to: if it is determined that the first state information and the second state information that are received by the first receiver 1211 meet a preset first handover condition, generate first handover information; the first transmitter 1213, configured to send the first handover information to the handover node, so that the handover node sends, to the UE, a first handover command that is generated according to the first handover information generated by the first processor 1212, and the UE attaches to the cellular network indicated by the first handover command, receives an IP address of the UE in the cellular network, and implements a handover from a WLAN to the cellular network; the third receiver 1231, configured to receive the first handover information sent by the control node, where the first handover information is generated when the control node acquires the first state information of the WLAN AP that the UE accesses and the second state information of the cellular network corresponding to the location of the UE and it is determined that the first state information and the second state information meet the preset first handover condition; the third processor 1232, configured to generate the first handover command according to the first handover information received by the third receiver 1231; the third transmitter 1233, configured to send the first handover command generated by the third processor 1232 to the UE, so that the UE receives the first handover command that is generated according to the first handover information by the handover node, attaches to the cellular network indicated by the first handover command, receives the IP address of the UE in the cellular network, and implements a handover from the WLAN to the cellular network; the second receiver 1221, configured to receive the first handover command that is generated according to the first handover information by the handover node, where the first handover information is generated when the control node acquires the first state information of the WLAN AP that the UE accesses and the second state information of the cellular network corresponding to the location of the UE and it is determined that the first state information and the second state information meet the preset first handover condition; and the second processor 1222, configured to attach to the cellular network indicated by the first handover command received by the second receiver 1221; where the second receiver 1221 is further configured to: after the second processor 1222 attaches to the cellular network indicated by the first handover command, receive the IP address of the UE in the cellular network, and implement a handover from the WLAN to the cellular network.

In conclusion, according to the network handover system provided in this embodiment, first state information of a wireless local area network access point (WLAN AP) that user equipment UE accesses and second state information of a cellular network corresponding to a location of the UE are acquired; if it is determined that the first state information and the second state information meet a preset first handover condition, first handover information is generated; and the first handover information is sent to a handover node, so that the handover node sends, to the UE, a first handover command that is generated according to the first handover information, and the UE attaches to the cellular network indicated by the first handover command, receives an Internet Protocol (IP) address of the UE in the cellular network, and implements a handover from the WLAN to the cellular network. A handover occasion can be determined according to state information of the cellular network and the WLAN, and therefore effects of improving accuracy of a network handover and reducing complexity of the network handover are achieved by resolving a problem that because states of the cellular network and the WLAN cannot be acquired before the UE decides by itself to initiate a network handover, the UE cannot determine the handover occasion according to the states, which not only reduces accuracy of a network handover, but also increases complexity of the network handover.

Figure 13:
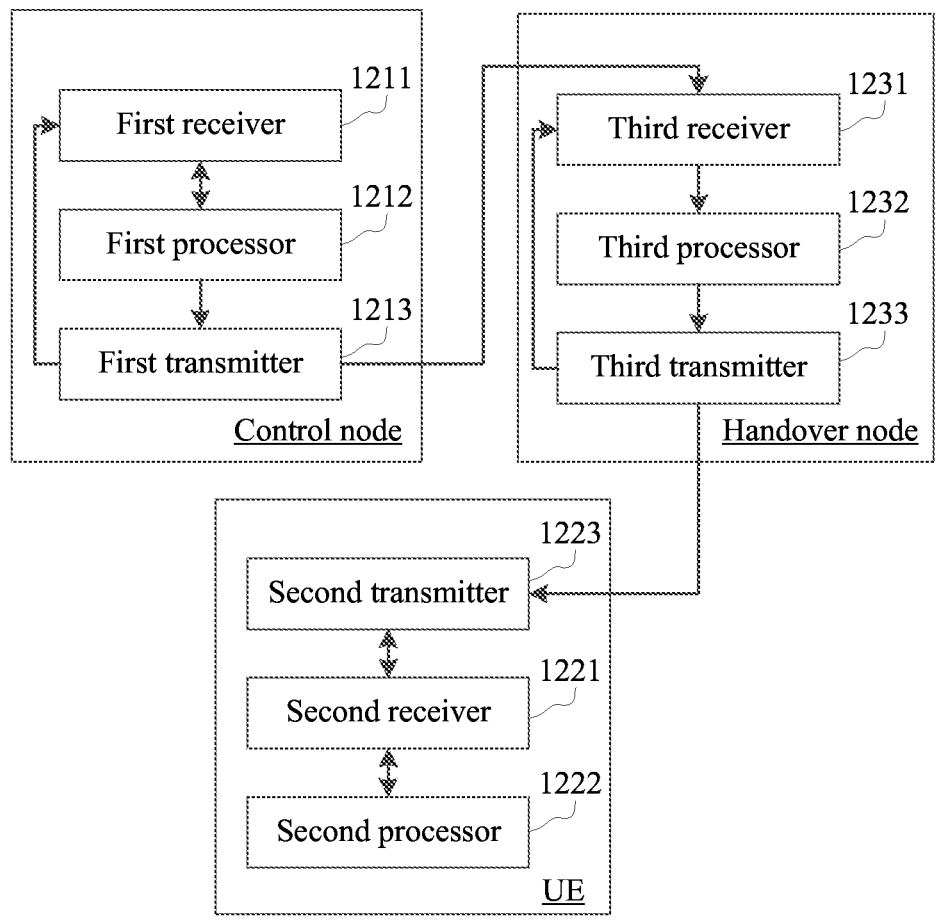
FIG. 13 is a structural block diagram of a network handover system according to yet another embodiment.

Referring to FIG. 13, FIG. 13 is a structural block diagram of a network handover system according to yet another embodiment. The network handover system is used for a handover from a WLAN to a cellular network and may include: a control node, user equipment UE, and a handover node. A control apparatus included in the control node may include: a first receiver 1211, a first processor 1212, and a first transmitter 1213; a user apparatus included in the UE may include: a second receiver 1221 and a second processor 1222; a handover apparatus included in the handover node may include: a third receiver 1231, a third processor 1232, and a transmitter 1233. The network handover system may include: the first receiver 1211, configured to acquire first state information of a WLAN AP that the UE accesses and second state information of a cellular network corresponding to a location of the UE; the first processor 1212, configured to: if it is determined that the first state information and the second state information that are received by the first receiver 1211 meet a preset first handover condition, generate first handover information; the first transmitter 1213, configured to send the first handover information to the handover node, so that the handover node sends, to the UE, a first handover command that is generated according to the first handover information generated by the first processor 1212, and the UE attaches to the cellular network indicated by the first handover command, receives an IP address of the UE in the cellular network, and implements a handover from a WLAN to the cellular network; the third receiver 1231, configured to receive the first handover information sent by the control node, where the first handover information is generated when the control node acquires the first state information of the WLAN AP that the UE accesses and the second state information of the cellular network corresponding to the location of the UE and it is determined that the first state information and the second state information meet the preset first handover condition; the third processor 1232, configured to generate the first handover command according to the first handover information received by the third receiver 1231; the third transmitter 1233, configured to send the first handover command generated by the third processor 1232 to the UE, so that the UE receives the first handover command that is generated according to the first handover information by the handover node, attaches to the cellular network indicated by the first handover command, receives the IP address of the UE in the cellular network, and implements a handover from the WLAN to the cellular network; the second receiver 1221, configured to receive the first handover command that is generated according to the first handover information by the handover node, where the first handover information is generated when the control node acquires the first state information of the WLAN AP that the UE accesses and the second state information of the cellular network corresponding to the location of the UE and it is determined that the first state information and the second state information meet the preset first handover condition; and the second processor 1222, configured to attach to the cellular network indicated by the first handover command received by the second receiver 1231.

The second receiver 1231 is further configured to: after the second processor 1232 attaches to the cellular network indicated by the first handover command, receive the IP address of the UE in the cellular network, and implement a handover from the WLAN to the cellular network.

The third receiver 1231 is further configured to: before receiving the first handover information sent by the control node, acquire the location of the UE by using user plane signaling; or acquire the location of the UE by using IPsec, IKE, EAP, or dedicated control signaling.

The third transmitter 1233 is further configured to send the location acquired by the third receiver 1231 to the control node, so that after acquiring the location, the control node acquires the first state information of the WLAN AP that the UE accesses and the second state information of the cellular network corresponding to the location.

Correspondingly, the first receiver 1211 is specifically configured to: acquire the location of the UE; determine an AC/a BNG of a WLAN that the UE accesses and acquire the first state information of the WLAN AP from the AC/BNG; and search for the second state information of the cellular network corresponding to the location of the UE, where the cellular network corresponding to the location of the UE is: a cellular network to which the UE connects, or a cellular network that the UE camps on, or a cellular network corresponding to a coverage area to which the location belongs, or a cellular network corresponding to a coverage area adjacent to a coverage area to which the location belongs.

The third receiver 1231 is further configured to: before receiving the first handover information sent by the control node, acquire, by using the user plane signaling, a UE identity and acquire a packet data network PDN identity; or acquire, by using the IPsec, the IKE, the EAP, or the dedicated control signaling, a UE identity and acquire a PDN identity.

The third transmitter 1233 is further configured to send the UE identity and the PDN identity that are acquired by the third receiver 1231 to the control node, so that the control node establishes a cellular network handover preparation context according to the UE identity and the PDN identity.

Correspondingly, the first receiver 1211 is further configured to: after the first processor 1212 determines that the first state information and the second state information meet the preset first handover condition, acquire the UE identity and the packet data network PDN identity; the first processor 1212 is further configured to establish a cellular network handover preparation context according to the UE identity and the PDN identity that are acquired by the first receiver 1211; the first receiver 1211 is further configured to: after the first processor 1212 establishes the cellular network handover preparation context according to the UE identity and PDN identity, read a UE identity of the UE that currently attaches to the cellular network; the first processor 1212 is further configured to: search for a cellular network handover preparation context corresponding to the UE identity received by the first receiver 1211, and if the cellular network handover preparation context corresponding to the UE identity is found, set a first handover instruction; and the first transmitter 1213 is further configured to send the first handover instruction set by the first processor 1212 and the PDN identity acquired by the first receiver to a mobility management device, so that the mobility management device instructs a PGW to allocate the IP address of the UE in the cellular network to the UE, and the UE implements a handover from the WLAN to the cellular network, where the IP address of the UE in the cellular network is the same as an IP address of the UE in the WLAN.

Further, if the cellular network is a UMTS or a GSM and the first handover command includes the PDN identity, a second transmitter 1223 is configured to: before the second receiver 1221 receives the IP address of the UE in the cellular network, send, to the control node, the PDN identity or both the PDN identity and a preset parameter that carries the UE identity, so that after finding a cellular network handover preparation context corresponding the acquired UE identity, the control node sets the first handover instruction and sends the first handover instruction to the mobility management device, so that the mobility management device instructs the PGW to allocate the IP address of the UE in the cellular network to the UE, where the preset parameter is an APN or a PCO, and the IP address of the UE in the cellular network is the same as the IP address of the UE in the WLAN.

Further, the second transmitter 1223 is further configured to add the UE identity into radio resource control RRC information and send the RRC information to the control node; or the second receiver 1221 is further configured to receive an identity request sent by the control node, and the second transmitter 1223 is further configured to feed back a UE identity to the control node according to the identity request received by the second receiver 1221.

Correspondingly, the first receiver 1211 is specifically configured to acquire the UE identity in an attach request sent by the UE; or the first transmitter 1213 is configured to send an identity request to the UE, and the first receiver 1211 is configured to receive a UE identity that is fed back by the UE according to the identity request sent by the first transmitter 1213; or the first receiver 1211 is configured to acquire the UE identity carried in the preset parameter, where the preset parameter is an APN or a PCO; or the first receiver 1211 is configured to acquire the UE identity in the RRC information sent by the UE.

Specifically, the first transmitter 1213 is configured to: if the cellular network is a UMTS or a GSM, send, by the control node, the first handover instruction and the PDN identity that is carried in the cellular network handover preparation context to an SGSN, or instruct, by the control node, a first node to send the first handover instruction and the PDN identity that is carried in the cellular network handover preparation context to the SGSN, so that the SGSN determines the PGW according to the first handover instruction, the PDN identity, and subscription information of the UE and sends a second handover instruction and the PDN identity to the PGW, and the PGW returns, to the SGSN according to the second handover instruction and the PDN identity, the IP address that is of the UE in the cellular network and allocated to the UE; or if the cellular network is LTE, send, by the control node, the first handover instruction and the PDN identity that is carried in the cellular network handover preparation context to an MME, or instruct, by the control node, a second node to send the first handover instruction and the PDN identity that is carried in the cellular network handover preparation context to the MME, so that the MME determines the PGW according to the first handover instruction, the PDN identity, and subscription information of the UE and sends a second handover instruction and the PDN identity to the PGW, and the PGW returns, to the MME according to the second handover instruction and the PDN identity, the IP address that is of the UE in the cellular network and allocated to the UE; where the IP address of the UE in the cellular network is the same as the IP address of the UE in the WLAN.

Further, the third transmitter 1233 is specifically configured to: send, by using the user plane signaling, the first handover command to the UE; or send, by using the Internet Protocol Security (IPsec) protocol, the Internet Key Exchange (IKE) protocol, the Extensible Authentication Protocol (EAP), or the dedicated control signaling, the first handover command to the UE.

Correspondingly, the second receiver 1221 is specifically configured to: receive the first handover command by using the user plane signaling; or receive the first handover command by using the IPsec, the IKE, the EAP, or the dedicated control signaling.

In conclusion, according to the network handover system provided in this embodiment, first state information of a wireless local area network access point (WLAN AP) that user equipment (UE) accesses and second state information of a cellular network corresponding to a location of the UE are acquired; if it is determined that the first state information and the second state information meet a preset first handover condition, first handover information is generated; and the first handover information is sent to a handover node, so that the handover node sends, to the UE, a first handover command that is generated according to the first handover information, and the UE attaches to the cellular network indicated by the first handover command, receives an Internet Protocol (IP) address of the UE in the cellular network, and implements a handover from the WLAN to the cellular network. A handover occasion can be determined according to state information of the cellular network and the WLAN, and therefore effects of improving accuracy of a network handover and reducing complexity of the network handover are achieved by resolving a problem that because states of the cellular network and the WLAN cannot be acquired before the UE decides by itself to initiate a network handover, the UE cannot determine the handover occasion according to the states, which not only reduces accuracy of a network handover, but also increases complexity of the network handover. In addition, a PDN identity is sent to a PGW, so that the PGW can allocate an IP address to the UE according to the PDN identity, and the IP address of the UE does not change after a handover, which resolves a problem that a service is interrupted due to a change of the IP address of the UE after the handover, and achieves an effect of optimizing the network handover.

Figure 14:
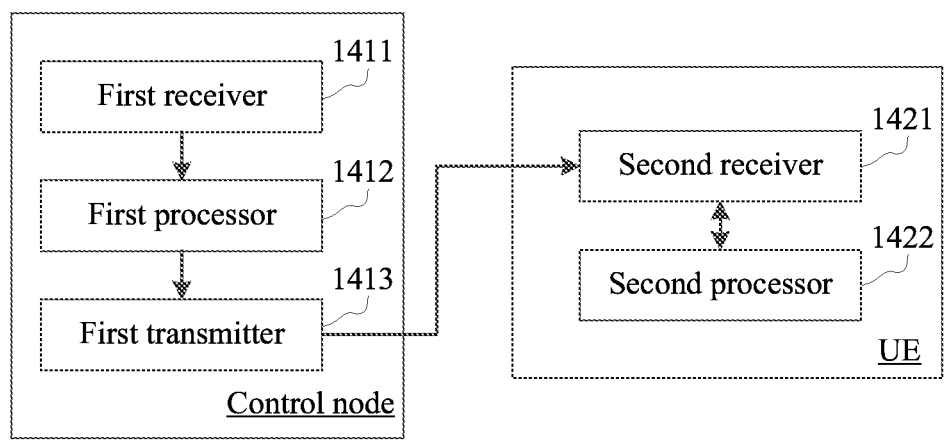
FIG. 14 is a structural block diagram of a network handover system according to yet another embodiment.

Referring to FIG. 14, FIG. 14 is a structural block diagram of a network handover system according to yet another embodiment. The network handover system is used for a handover from a cellular network to a WLAN and may include: a control node and user equipment UE. A control apparatus included in the control node may include: a first receiver 1411, a first processor 1412, and a first transmitter 1413; a user apparatus included in the UE may include: a second receiver 1421 and a second processor 1422. The network handover system may include: the first receiver 1411, configured to acquire first state information of a WLAN AP corresponding to a location of the UE and second state information of a cellular network that the UE accesses; the first processor 1412, configured to: if it is determined that the first state information and the second state information that are received by the first receiver 1411 meet a preset second handover condition, generate second handover information; the first transmitter 1413, configured to instruct a preset node to send, to the UE, a second handover command that is generated according to the second handover information generated by the first processor 1412, so that the UE accesses the WLAN AP indicated by the second handover command, receives an IP address of the UE in a WLAN, and implements a handover from the cellular network to the WLAN; the second receiver 1421, configured to receive the second handover command that is generated according to the second handover information, where the second handover information is generated when the control node acquires the first state information of the WLAN AP corresponding to the location of the UE and the second state information of the cellular that the UE accesses and it is determined the first state information and the second state information meet the preset second handover condition; and the second processor 1422, configured to access the WLAN AP indicated by the second handover command received by the second receiver 1421; where the second receiver 1421 is further configured to: after the second processor 1422 accesses the WLAN AP indicated by the second handover command, receive the IP address of the UE in the WLAN, and implement a handover from the cellular network to the WLAN.

In conclusion, according to the network handover system provided in this embodiment, first state information of a wireless local area network access point (WLAN AP) corresponding to a location of user equipment UE and second state information of a cellular network that the UE accesses are acquired; if it is determined that the first state information and the second state information meet a preset second handover condition, second handover information is generated; and a preset node is instructed to send, to the UE, a second handover command that is generated according to the second handover information, so that the UE accesses the WLAN AP indicated by the second handover command, receives an Internet Protocol IP address of the UE in the WLAN, and implements a handover from the cellular network to the WLAN. A handover occasion can be determined according to state information of the cellular network and the WLAN, and therefore effects of improving accuracy of a network handover and reducing complexity of the network handover are achieved by resolving a problem that because states of the cellular network and the WLAN cannot be acquired before the UE decides by itself to initiate a network handover, the UE cannot determine the handover occasion according to the states, which not only reduces accuracy of a network handover, but also increases complexity of the network handover.

Figure 15:
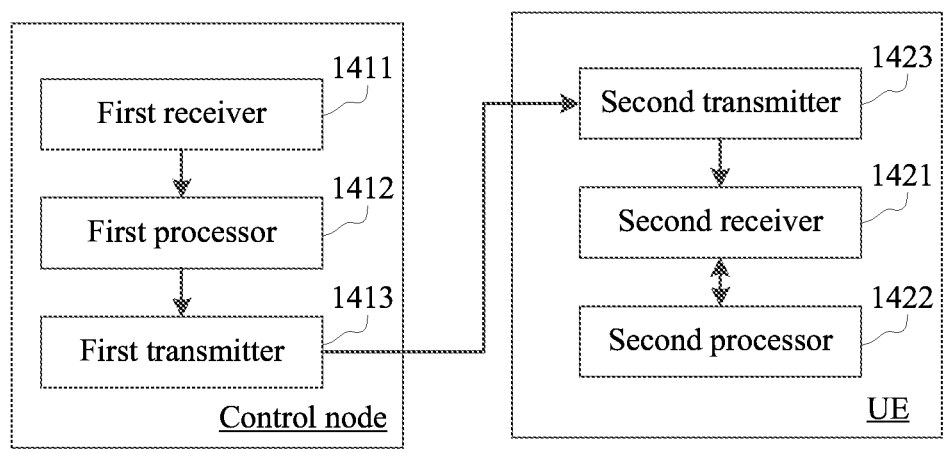
FIG. 15 is a structural block diagram of a network handover system according to yet another embodiment.

Referring to FIG. 15, FIG. 15 is a structural block diagram of a network handover system according to yet another embodiment. The network handover system is used for a handover from a cellular network to a WLAN and may include: a control node and user equipment (UE). A control apparatus included in the control node may include: a first receiver 1411, a first processor 1412, and a first transmitter 1413; a user apparatus included in the UE may include: a second receiver 1421 and a second processor 1422. The network handover system may include: the first receiver 1411, configured to acquire first state information of a WLAN AP corresponding to a location of the UE and second state information of a cellular network that the UE accesses; the first processor 1412, configured to: if it is determined that the first state information and the second state information that are received by the first receiver 1411 meet a preset second handover condition, generate second handover information; the first transmitter 1413, configured to instruct a preset node to send, to the UE, a second handover command that is generated according to the second handover information generated by the first processor 1412, so that the UE accesses the WLAN AP indicated by the second handover command, receives an IP address of the UE in a WLAN, and implements a handover from the cellular network to the WLAN; the second receiver 1421, configured to receive the second handover command that is generated according to the second handover information, where the second handover information is generated when the control node acquires the first state information of the WLAN AP corresponding to the location of the UE and the second state information of the cellular that the UE accesses and it is determined the first state information and the second state information meet the preset second handover condition; and the second processor 1422, configured to access the WLAN AP indicated by the second handover command received by the second receiver 1421; where the second receiver 1421 is further configured to: after the second processor 1422 accesses the WLAN AP indicated by the second handover command, receive the IP address of the UE in the WLAN, and implement a handover from the cellular network to the WLAN.

Further, the user apparatus further includes: a second transmitter 1423, configured to: before the second receiver 1421 receives the second handover command that is generated according to the second handover information, report the location of the UE to the control node, so that after acquiring the location, the control node acquires the first state information of the WLAN AP corresponding to the location and the second state information of the cellular network that the UE accesses.

Correspondingly, the first receiver 1411 is specifically configured to: acquire the location of the UE; search for an access controller AC/a broadband network gateway BNG of a WLAN AP that is corresponding to a coverage area to which the location belongs or corresponding to a coverage area adjacent to a coverage area to which the location belongs, and acquire the first state information of the WLAN AP from the AC/BNG; and acquire the second state information of the cellular network that the UE accesses.

Further, the second transmitter 1423 is further configured to: before the first receiver 1411 receives the second handover command that is generated according to the second handover information, report a UE identity to the control node, where the UE identity is added into notification information and sent to a TGW by the control node, so that the TGW establishes a WLAN handover preparation context according to the UE identity and a packet data network PDN identity that is added by the control node into the notification information, and after finding a WLAN handover preparation context corresponding to a UE identity of UE that performs WLAN AP access authentication, determines a PGW according to the WLAN handover preparation context and subscription information of the UE and sends a handover instruction to the PGW, and the PGW returns, to the TGW according to the handover instruction, the IP address that is of the UE in the WLAN and allocated to the UE, where the IP address of the UE in the WLAN is the same as an IP address of the UE in the cellular network.

Correspondingly, the first receiver 1411 is specifically configured to acquire a UE identity, an identifier of the WLAN AP, and a packet data network PDN identity; and the first processor 1412 is further configured to add the UE identity, the identifier of the WLAN AP, and the PDN identity that are acquired by the first receiver 1411 into the second handover information, so that when generating notification information, an MCF-C adds, into the notification information, the UE identity and the PDN identity that are carried in the second handover information, and adds, into the second handover command, the identifier of the WLAN AP that is carried in the second handover information.

Further, the first processor 1412 is further configured to: after generating the second handover information, add, into the notification information, the UE identity and the PDN identity that are carried in the second handover information; and the first transmitter 1413 is further configured to: send the notification information generated by the first processor 1412 to the TGW; or send the notification information generated by the first processor 1412 to an MCF-W, and the MCF-W forwards the notification information to the TGW, so that the TGW establishes a WLAN handover preparation context according to the UE identity and the PDN identity, and after finding a WLAN handover preparation context corresponding to a UE identity of UE that performs WLAN AP access authentication, determines a PGW according to the WLAN handover preparation context and subscription information of the UE and sends a handover instruction to the PGW, and the PGW returns, to the TGW according to the handover instruction, the IP address that is of the UE in the WLAN and allocated to the UE, where the IP address of the UE in the WLAN is the same as an IP address of the UE in the cellular network.

In conclusion, according to the network handover system provided in this embodiment, first state information of a wireless local area network access point WLAN AP corresponding to a location of user equipment UE and second state information of a cellular network that the UE accesses are acquired; if it is determined that the first state information and the second state information meet a preset second handover condition, second handover information is generated; and a preset node is instructed to send, to the UE, a second handover command that is generated according to the second handover information, so that the UE accesses the WLAN AP indicated by the second handover command, receives an Internet Protocol IP address of the UE in the WLAN, and implements a handover from the cellular network to the WLAN. A handover occasion can be determined according to state information of the cellular network and the WLAN, and therefore effects of improving accuracy of a network handover and reducing complexity of the network handover are achieved by resolving a problem that because states of the cellular network and the WLAN cannot be acquired before the UE decides by itself to initiate a network handover, the UE cannot determine the handover occasion according to the states, which not only reduces accuracy of a network handover, but also increases complexity of the network handover. In addition, a PDN identity is sent to a PGW, so that the PGW can allocate an IP address to the UE according to the PDN identity, and the IP address of the UE does not change after a handover, which resolves a problem that a service is interrupted due to a change of the IP address of the UE after the handover, and achieves an effect of optimizing the network handover.

Figure 16:
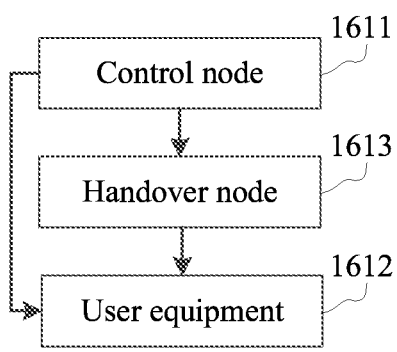
FIG. 16 is a structural block diagram of a network handover system according to yet another embodiment.

Referring to FIG. 16, FIG. 16 is a structural block diagram of a network handover system according to yet another embodiment. The network handover system may include: a control node 1611, user equipment UE 1612, and a handover node 1613.

The control node 1611 may be the control node shown in FIG. 8, FIG. 9, FIG. 10, or FIG. 11; the UE 1612 may be the UE shown in FIG. 8, FIG. 9, FIG. 10, or FIG. 11; the handover node 1613 may be the handover node shown in FIG. 9 or FIG. 11; or the control node 1611 may be the control node shown in FIG. 12, FIG. 13, FIG. 14, or FIG. 15; the UE 1612 may be the UE shown in FIG. 12, FIG. 13, FIG. 14, or FIG. 15; the handover node 1613 may be the handover node shown in FIG. 13 or FIG. 15.

In conclusion, according to the network handover system provided in this embodiment, first state information of a wireless local area network access point WLAN AP that user equipment UE accesses and second state information of a cellular network corresponding to a location of the UE are acquired; if it is determined that the first state information and the second state information meet a preset first handover condition, first handover information is generated; and the first handover information is sent to a handover node, so that the handover node sends, to the UE, a first handover command that is generated according to the first handover information, and the UE attaches to the cellular network indicated by the first handover command, receives an Internet Protocol IP address of the UE in the cellular network, and implements a handover from the WLAN to the cellular network. A handover occasion can be determined according to state information of the cellular network and the WLAN, and therefore effects of improving accuracy of a network handover and reducing complexity of the network handover are achieved by resolving a problem that because states of the cellular network and the WLAN cannot be acquired before the UE decides by itself to initiate a network handover, the UE cannot determine the handover occasion according to the states, which not only reduces accuracy of a network handover, but also increases complexity of the network handover. In addition, a PDN identity is sent to a PGW, so that the PGW can allocate an IP address to the UE according to the PDN identity, and the IP address of the UE does not change after a handover, which resolves a problem that a service is interrupted due to a change of the IP address of the UE after the handover, and achieves an effect of optimizing the network handover.

It should be noted that when the network handover apparatus provided in the foregoing embodiment performs a network handover, division of the foregoing functional modules is merely used as an example for description; in actual application, the foregoing functions may be allocated, according to a requirement, to different functional modules for implementing, that is, an internal structure of the network handover apparatus is divided into different functional modules to implement all or some of the functions described above. In addition, the network handover apparatus provided in the foregoing embodiment pertains to a same concept as the embodiments of the network handover method. For a specific implementation process of the network handover apparatus, reference may be made to the method embodiments, and details are not described herein again.

The sequence numbers of the foregoing embodiments of the present invention are merely for illustrative purposes, and are not intended to indicate priorities of the embodiments.

A person of ordinary skill in the art may be aware that in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of the present invention.

It may be clearly understood by a person skilled in the art that for the purpose of convenient and brief description, for a detailed working process of the foregoing system, apparatus, and unit, reference may be made to a corresponding process in the foregoing method embodiments, and details are not described herein again.

In the several embodiments provided in the present application, it should be understood that the disclosed system, apparatus, and method may be implemented in other manners. For example, the described apparatus embodiment is merely exemplary. For example, the unit division may merely be logical function division and may be other division in actual implementation. For example, a plurality of units or components may be combined or integrated into another system, or some features may be ignored or not performed. In addition, the shown or discussed mutual couplings or direct couplings or communication connections may be implemented through some interfaces. The indirect couplings or communication connections between the apparatuses or units may be implemented in electrical, mechanical, or other forms.

The units described as separate parts may or may not be physically separate, and parts shown as units may or may not be physical units, may be located in one position, or may be distributed on a plurality of network units. Some or all of the units may be selected according to actual needs to achieve the objectives of the solutions of the embodiments.

In addition, functional units in the embodiments of the present invention may be integrated into one processing unit, or each of the units may exist alone physically, or two or more units are integrated into one unit.

When the functions are implemented in the form of a software functional unit and sold or used as an independent product, the functions may be stored in a computer-readable storage medium. Based on such understanding, the technical solutions of the present invention essentially, or the part contributing to the prior art, or some of the technical solutions may be implemented in a form of a software product. The software product is stored in a storage medium, and includes several instructions for instructing a computer device (which may be a personal computer, a server, a network device, or the like) to perform all or some of the steps of the methods described in the embodiments of the present invention. The foregoing storage medium includes: any medium that can store program code, such as a USB flash drive, a removable hard disk, a read-only memory (ROM), a random access memory (RAM), a magnetic disk, or an optical disc.

The foregoing descriptions are merely specific implementation manners of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A method, comprising:
receiving, by a user equipment (UE), a first handover command that is generated according to first handover information by a handover node, wherein the first handover information is generated when a control node acquires first state information of a wireless local area network access point (WLAN AP) that the UE accesses and second state information of a cellular network corresponding to a location of the UE, and when the control node determines that the first state information and the second state information meet a preset first handover condition, wherein the WLAN AP belongs to a wireless local area network (WLAN), and wherein the handover node and the control node are network-side nodes;
attaching, by the UE, to the cellular network indicated by the first handover command;
receiving, by the UE, an Internet Protocol (IP) address of the UE in the cellular network, and implementing a handover from the WLAN to the cellular network; and
adding a UE identity into radio resource control (RRC) information and sending the RRC information to the control node, or receiving an identity request sent by the control node and feeding back the UE identity to the control node according to the identity request.

2. The method according to claim 1, wherein receiving the first handover command that is generated according to first handover information by the handover node comprises:
receiving, by the UE using user plane signaling, the first handover command generated by the handover node; or
receiving, by the UE using Internet Protocol Security (IPsec) protocol, Internet Key Exchange (IKE) protocol, Extensible Authentication Protocol (EAP), or dedicated control signaling, the first handover command generated by the handover node.

3. The method according to claim 1, wherein the cellular network is a Universal Mobile Telecommunications System (UMTS) or a Global System for Mobile Communications (GSM) network, and the first handover command comprises a packet data network (PDN) identity, and the method further comprises:
before receiving the IP address of the UE in the cellular network, sending, to the control node, the PDN identity, or both the PDN identity and a preset parameter that carries a UE identity, so that after finding a cellular network handover preparation context corresponding to the UE identity, the control node sets a first handover instruction and sends the first handover instruction to a mobility management device, and the mobility management device instructs a PGW to allocate the IP address of the UE in the cellular network to the UE, wherein the preset parameter is an access point name (APN) or a protocol configuration option (PCO), and the IP address of the UE in the cellular network is the same as an IP address of the UE in the WLAN.

4. A method, comprising:
acquiring, by a control node, first state information of a wireless local area network access point (WLAN AP) corresponding to a location of user equipment (UE) and second state information of a cellular network that the UE accesses, wherein the control node is a network-side node;
in response to determining that the first state information and the second state information meet a preset second handover condition, generating, by the control node, second handover information, wherein generating the second handover information comprises:
acquiring a UE identity, an identifier of the WLAN AP, and a packet data network (PDN) identity; and
adding the UE identity, the identifier of the WLAN AP, and the PDN identity into the second handover information, wherein the UE identity and the PDN identity are used to generate notification information; and
instructing, by the control node, a preset node to send, to the UE, a second handover command that is generated according to the identifier of the WLAN AP, so that the UE accesses the WLAN AP indicated by the second handover command, receives an Internet Protocol (IP) address of the UE in a WLAN, and implements a handover from the cellular network to the WLAN.

5. The method according to claim 4, wherein acquiring first state information of the WLAN AP corresponding to a location of the UE and second state information of the cellular network that the UE accesses comprises:
acquiring the location of the UE;
searching for an access controller (AC)/a broadband network gateway (BNG) of a WLAN AP that corresponds to a coverage area to which the location belongs, or that corresponds to a coverage area adjacent to a coverage area to which the location belongs, and acquiring the first state information of the WLAN AP from the AC/BNG; and
acquiring the second state information of the cellular network that the UE accesses.

6. The method according to claim 4, wherein after generating the second handover information, the method further comprises:
adding, into the notification information, the UE identity and the PDN identity that are carried in the second handover information; and
sending the notification information to a trusted gateway (TGW); or sending the notification information to a mobility control function-wireless local area network (MCF-W) and forwarding, by the MCF-W, the notification information to the TGW, so that the TGW establishes a WLAN handover preparation context according to the UE identity and the PDN identity, and after finding a WLAN handover preparation context corresponding to a UE identity of UE that performs WLAN AP access authentication, determines a packet data network gateway (PGW) according to the WLAN handover preparation context and subscription information of the UE and sends a handover instruction to the PGW, and the PGW returns, to the TGW according to the handover instruction, the IP address that is of the UE in the WLAN and allocated to the UE, wherein the IP address of the UE in the WLAN is the same as an IP address of the UE in the cellular network.

7. A method, comprising:
reporting, by a user equipment (UE), a location of the UE to a control node, so that after acquiring the location, the control node acquires first state information of a wireless local area network access point (WLAN AP) corresponding to the location of the UE and second state information of a cellular network that the UE accesses;
receiving, by the UE, a second handover command that is generated according to second handover information, wherein the second handover information is generated when the control node acquires the first state information of the WLAN AP corresponding to the location of the UE and the second state information of the cellular network that the UE accesses, and when the control node determines that the first state information and the second state information meet a preset second handover condition, wherein the WLAN AP belongs to a wireless local area network (WLAN), and wherein the control node is a network-side control node;
accessing, by the UE, the WLAN AP indicated by the second handover command; and
receiving, by the control node, an Internet Protocol (IP) address of the UE in the WLAN, and implementing a handover from the cellular network to the WLAN.

8. The method according to claim 7, wherein before receiving the second handover command, the method further comprises:
reporting a UE identity to the control node, wherein the UE identity is added into notification information and sent to a trusted gateway (TGW) by the control node, so that the TGW establishes a WLAN handover preparation context according to the UE identity and a packet data network (PDN) identity that is added by the control node into the notification information, and after finding a WLAN handover preparation context corresponding to a UE identity of UE that performs WLAN AP access authentication, determines a packet data network gateway (PGW) according to the WLAN handover preparation context and subscription information of the UE and sends a handover instruction to the PGW, and the PGW returns, to the TGW according to the handover instruction, the IP address that is of the UE in the WLAN and allocated to the UE, wherein the IP address of the UE in the WLAN is the same as an IP address of the UE in the cellular network.

9. A user apparatus, comprising:
a receiver, configured to receive a first handover command that is generated according to first handover information by a handover node, wherein the first handover information is generated when a control node acquires first state information of a wireless local area network access point (WLAN AP) that the user apparatus accesses and second state information of a cellular network corresponding to a location of the user apparatus, and when the control node determines that the first state information and the second state information meet a preset first handover condition, wherein the WLAN AP belongs to a wireless local area network (WLAN), and wherein the handover node and the control node are network-side nodes;
a processor; and
a computer-readable storage medium storing a program to be executed by the processor, the program including instructions for:
attaching to the cellular network indicated by the first handover command received by the receiver;
wherein the receiver is further configured to, after the user apparatus attaches to the cellular network indicated by the first handover command, receive an Internet Protocol (IP) address of the user apparatus in the cellular network and implement a handover from the WLAN to the cellular network; and
wherein the receiver is further configured to: receive, using user plane signaling, the first handover command generated by the handover node; or receive, using Internet Protocol Security (IPsec) protocol, Internet Key Exchange (IKE) protocol, Extensible Authentication Protocol (EAP), or dedicated control signaling, the first handover command generated by the handover node.

10. The user apparatus according to claim 9, wherein the cellular network is a Universal Mobile Telecommunications System (UMTS) or a Global System for Mobile Communications (GSM) network, the first handover command comprises a packet data network (PDN) identity, and the user apparatus further comprises:
a transmitter, configured to: before the receiver receives the Internet Protocol (IP) address of the user apparatus in the cellular network, send, to the control node, the PDN identity or both the PDN identity and a preset parameter that carries a user apparatus identity, so that after finding a cellular network handover preparation context corresponding to the user apparatus identity, the control node sets a first handover instruction and sends the first handover instruction to a mobility management device, and the mobility management device instructs a PGW to allocate the IP address of the user apparatus in the cellular network to the user apparatus, wherein the preset parameter is an access point name (APN) or a protocol configuration option (PCO), and the IP address of the user apparatus in the cellular network is the same as an IP address of the user apparatus in the WLAN.

11. The user apparatus according to claim 9, wherein the user apparatus further comprises:
a transmitter, configured to: add a user apparatus identity into radio resource control (RRC) information and send the RRC information to the control node; or
wherein the receiver is further configured to receive an identity request sent by the control node and feed back the user apparatus identity to the control node according to the identity request.

12. A user apparatus, comprising:
a receiver, configured to:
report a location of the user apparatus to a control node, so that after acquiring the location, the control node acquires first state information of a wireless local area network access point (WLAN AP) corresponding to the location and second state information of a cellular network that the user apparatus accesses;
receive a second handover command that is generated according to second handover information, wherein the second handover information is generated when the control node acquires the first state information of the WLAN AP corresponding to the location of the user apparatus and the second state information of the cellular network that the user apparatus accesses, and when the control node determines that the first state information and the second state information meet a preset second handover condition, and wherein the control node is a network-side node;
a processor; and
a computer-readable storage medium storing a program to be executed by the processor, the program including instructions for:
  accessing the WLAN AP indicated by the second handover command received by the receiver;
wherein the receiver is further configured to: after the user apparatus accesses the WLAN AP indicated by the second handover command, receive an Internet Protocol (IP) address of the UE in a wireless local area network (WLAN), and implement a handover from the cellular network to the WLAN.

13. The user apparatus according to claim 12, wherein the program further includes instructions for:
  before the receiver receives the second handover command that is generated according to the second handover information, reporting a user apparatus identity to the control node;
  wherein the user apparatus identity is added into notification information and sent to a trusted gateway (TGW) by the control node, so that the TGW establishes a WLAN handover preparation context according to the user apparatus identity and a packet data network (PDN) identity that is added by the control node into the notification information, and after finding a WLAN handover preparation context corresponding to a user apparatus identity of user apparatus that performs WLAN AP access authentication, determines a packet data network gateway (PGW) according to the WLAN handover preparation context and subscription information of the user apparatus and sends a handover instruction to the PGW, and the PGW returns, to the TGW according to the handover instruction, the IP address that is of the user apparatus in the WLAN and allocated to the user apparatus, wherein the IP address of the user apparatus in the WLAN is the same as an IP address of the user apparatus in the cellular network.

14. A user apparatus, comprising:
a receiver, configured to receive a first handover command that is generated according to first handover information by a handover node, wherein the first handover information is generated when a control node acquires first state information of a wireless local area network access point (WLAN AP) that the user apparatus accesses and second state information of a cellular network corresponding to a location of the user apparatus, and when the control node determines that the first state information and the second state information meet a preset first handover condition, wherein the WLAN AP belongs to a wireless local area network (WLAN), and wherein the handover node and the control node are network-side nodes; and
a processor, configured to attach to the cellular network indicated by the first handover command received by the receiver;
wherein the receiver is further configured to, after the processor attaches to the cellular network indicated by the first handover command, receive an Internet Protocol (IP) address of the user apparatus in the cellular network, and implement a handover from the WLAN to the cellular network; and
wherein the receiver is further configured to receive, using user plane signaling, the first handover command generated by the handover node; or receive, using Internet Protocol Security (IPsec) protocol, Internet Key Exchange (IKE) protocol, Extensible Authentication Protocol (EAP), or dedicated control signaling, the first handover command generated by the handover node.

* * * * *